(12) United States Patent
Feng et al.

(10) Patent No.: US 9,350,522 B2
(45) Date of Patent: May 24, 2016

(54) SEARCH SPACE FOR UPLINK GRANT IN AN AGGREGATED-CARRIER MOBILE COMMUNICATION SYSTEM

(75) Inventors: Sujuan Feng, Frankfurt am Main (DE); Alexander Golitschek Edler von Elbwart, Darmstadt (DE); Christian Wengerter, Kleinheubach (DE); Ayako Horiuchi, Kanagawa (JP); Akihiko Nishio, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 245 days.

(21) Appl. No.: 14/006,332

(22) PCT Filed: Mar. 21, 2012

(86) PCT No.: PCT/EP2012/001251
§ 371 (c)(1),
(2), (4) Date: Nov. 18, 2013

(87) PCT Pub. No.: WO2012/126622
PCT Pub. Date: Sep. 27, 2012

(65) Prior Publication Data
US 2014/0064205 A1    Mar. 6, 2014

(30) Foreign Application Priority Data

Mar. 23, 2011    (EP) .................................... 11002410

(51) Int. Cl.
*H04L 5/00*    (2006.01)

(52) U.S. Cl.
CPC .............. *H04L 5/0092* (2013.01); *H04L 5/001* (2013.01); *H04L 5/0053* (2013.01); *H04L 5/0094* (2013.01); *Y02B 60/43* (2013.01)

(58) Field of Classification Search
CPC ......... H04L 5/0092; H04L 12/26; H04L 5/00; H04W 72/14; H04W 72/0466; H04B 7/14
See application file for complete search history.

(56) References Cited

U.S. PATENT DOCUMENTS

2011/0194412 A1* 8/2011 Park et al. ...................... 370/241
2011/0250897 A1* 10/2011 Seo et al. ........................ 455/445

OTHER PUBLICATIONS

International Search Report for Application No. PCT/EP2012/001251 dated Sep. 27, 2012.
Extended European Search Report for Application No. 11002410.6-2415 dated Oct. 24, 2011.
Panasonic: "Resource allocation schemes of R-PDCCH", 3GPP Draft; R1-110777, 3rd Generation Partnership Project (3GPP), Mobile Competence Centre; 650, Route Des Lucioles; F-06921 Sophia-Antipolis Cedex; France, vol. RAN WG1, no. Taipei, Taiwan; Feb. 21, 2011, Feb. 15, 2011. XP050490575.

(Continued)

*Primary Examiner* — Anez Ebrahim
(74) *Attorney, Agent, or Firm* — Pearne & Gordon LLP

(57) ABSTRACT

The present invention relates to transmitting and receiving of control information in a system supporting carrier aggregation. A search space for control information is configured in such a way that at least two search spaces determined by respective component carriers are on a first slot of a subframe and a further search space determined by a further component carrier is on a second slot, wherein at least one candidate of search spaces in the first slot is mapped in a same resource block pair with at least one candidate of a search space in the second slot.

20 Claims, 16 Drawing Sheets

(56) References Cited

OTHER PUBLICATIONS

LG-Nortel: "R-PDCCH Multiplexing for LTE-A relay node", 3GPP Draft; R1-103145 R-PDCCH Multiplexing for LTE-A Relay Node, 3rd Generation Partnership Project (3GPP), Mobile Competence Centre; 650, Route Des Lucioles; F-06921 Sophia-Antipolis Cedex; France, vol. RAN WG1, no. Montreal, Canada; May 10, 2010, May 4, 2010, XP050420213.

Panasonic: "R-PDCCH placement", 3GPP Draft; R1-103773, 3rd Generation Partnership Project (3GPP), Mobile Competence Centre; 650, Route Des Lucioles; F-06921 Sophia-Antipolis Cedex; France, vol. RAN WG1, no. Dresden, Germany; Jun. 28, 2010, Jun. 22, 2010. XP050449202.

LG Electronics, "Remaining Details in Non-interleaving R-PDCCH Transmission", 3GPP TSG RAN WG1 Meeting #63 R1-106135, 2010.

Notice of Reasons for Rejection dated Jan. 12, 2016 for Japanese Patent Application No. 2014-500283.

* cited by examiner

◍ Uu R-PDCCH UE specific search space for DL PCC

⊘ Uu R-PDCCH UE specific search space for DL SCC

⊖ Uu R-PDCCH UE specific search space for UL PCC

◐ Uu R-PDCCH UE specific search space for DL PCC
◍ Uu R-PDCCH UE specific search space for DL SCC1
◉ Uu R-PDCCH UE specific search space for DL SCC2
⊖ Uu R-PDCCH UE specific search space for UL PCC Table 1: The number of PRBs wasted: 2DL CCs + 1UL CC; Aggregation level 2

| DL PCC + SCC | UL | Aligned with PCC (Straightforward Solution) | Aligned with SCC (Variant1 solution) | Distributed over PCC,SCC (Main solution) |
|---|---|---|---|---|
| 0 + 0 | 1 | 2 | 2 | 2 |
| 1 + 0 | 1 | 0 | 2 | 0 |
| 0 + 1 | 1 | 4 | 0 | 0 |
| 1 + 1 | 1 | 2 | 0 | 0 |
| Average | | 2 | 1 | 0.5 |
| Maximum Loss | | 4 | 2 | 2 |
| Number of 0 | | 1 | 2 | 3 |

Fig. 23

Table 2: The number of PRBs wasted: Aggregation level 2

| Number of DL CCs | Number of UL CCs | Straightforward Sol. | Variant 1 Solution | Main Solution |
|---|---|---|---|---|
| 1 | 1 | 1 | 1 | 1 |
| 2 | 1 | 2 | 1 | 0,5 |
| 3 | 1 | 3 | 2 | 0,75 |
| 4 | 1 | 4 | 3 | 1,375 |
| 5 | 1 | 5 | 4 | 2,1875 |
| 2 | 2 | 1,6667 | 1,6667 | 1 |
| 3 | 2 | 2,6667 | 2 | 0,9167 |
| 4 | 2 | 3,6667 | 3 | 1,25 |
| 5 | 2 | 4,6667 | 4 | 1,8542 |
| 3 | 3 | 2,5714 | 2,5714 | 1,2857 |
| 4 | 3 | 3,5714 | 3 | 1,3214 |
| 5 | 3 | 4,5714 | 4 | 1,6696 |
| 4 | 4 | 3,5333 | 3,5333 | 1,6 |
| 5 | 4 | 4,5333 | 4 | 1,6792 |
| 5 | 5 | 4,5161 | 4,5161 | 1,8952 |

Fig. 24

SEARCH SPACE FOR UPLINK GRANT IN AN AGGREGATED-CARRIER MOBILE COMMUNICATION SYSTEM

FIELD OF THE INVENTION

The present invention relates to signaling uplink and downlink scheduling in an OFDM-based mobile communication system. In particular, the present invention relates to methods and apparatuses for configuration of search space and to search space channel structure for signaling of the uplink and downlink scheduling control information.

BACKGROUND OF THE INVENTION

Third generation (3G) mobile systems, such as, for instance, universal mobile telecommunication systems (UMTS) standardized within the third generation partnership project (3GPP) have been based on wideband code division multiple access (WCDMA) radio access technology. Today, 3G systems are being deployed on a broad scale all around the world. After enhancing this technology by introducing high-speed downlink packet access (HSDPA) and an enhanced uplink, also referred to as high-speed uplink packet access (HSUPA), the next major step in evolution of the UMTS standard has brought the combination of orthogonal frequency division multiplexing (OFDM) for the downlink and single carrier frequency division multiplexing access (SC-FDMA) for the uplink. This system has been named long term evolution (LTE) since it has been intended to cope with future technology evolutions.

The LTE system represents efficient packet based radio access and radio access networks that provide full IP-based functionalities with low latency and low cost. The detailed system requirements are given in 3GPP TR 25.913, *"Requirements for evolved UTRA (E-UTRA) and evolved UTRAN (E-UTRAN),"* v8.0.0, January 2009, (available at http://www.3gpp.org/ and incorporated herein by reference). The Downlink will support data modulation schemes QPSK, 16QAM, and 64QAM and the Uplink will support BPSK, QPSK, 8PSK and 16QAM. LTE's network access is to be extremely flexible, using a number of defined channel bandwidths between 1.25 and 20 MHz, contrasted with UMTS terrestrial radio access (UTRA) fixed 5 MHz channels. Spectral efficiency is increased by up to four-fold compared with UTRA, and improvements in architecture and signaling reduce round-trip latency. Multiple Input/Multiple Output (MIMO) antenna technology should enable 10 times as many users per cell as 3GPP's original WCDMA radio access technology. To suit as many frequency band allocation arrangements as possible, both paired (frequency division duplex FDD) and unpaired (time division duplex TDD) band operation is supported. LTE can co-exist with earlier 3GPP radio technologies, even in adjacent channels, and calls can be handed over to and from all 3GPP's previous radio access technologies.

FIG. 1 illustrates structure of a component carrier in LTE Release 8. The downlink component carrier of the 3GPP LTE Release 8 is sub-divided in the time-frequency domain in so-called sub-frames each of which is divided into two downlink slots 120 corresponding to a time period $T_{slot}$. The first downlink slot comprises a control channel region within the first OFDM symbol(s). Each sub-frame consists of a given number of OFDM symbols in the time domain, each OFDM symbol spanning over the entire bandwidth of the component carrier. The smallest unit of resources that can be assigned by a scheduler is a resource block 130 also called physical resource block (PRB). A PRB 130 is defined as $N_{symb}^{DL}$ consecutive OFDM symbols in the time domain and $N_{sc}^{RB}$ consecutive sub-carriers in the frequency domain. In practice, the downlink resources are assigned in resource block pairs. A resource block pair consists of two resource blocks. It spans $N_{sc}^{RB}$ consecutive sub-carriers in the frequency domain and the entire $2 \cdot N_{symb}^{DL}$ modulation symbols of the sub-frame in the time domain. $N_{symb}^{DL}$ may be either 6 or 7 resulting in either 12 or 14 OFDM symbols in total. Consequently, a physical resource block 130 consists of $N_{symb}^{DL} \times N_{sc}^{RB}$ resource elements 140 corresponding to one slot in the time domain and 180 kHz in the frequency domain (further details on the downlink resource grid can be found, for example, in 3GPP TS 36.211, *"Evolved universal terrestrial radio access (E-UTR); physical channels and modulations (Release 8)", version* 8.9.0, December 2009, Section 6.2, available at http://www.3gpp.org. which is incorporated herein by reference).

The number of physical resource blocks $N_{RB}^{DL}$ in downlink depends on the downlink transmission bandwidth configured in the cell and is at present defined in LTE as being from the interval of 6 to 110 PRBs.

The data are mapped onto physical resource blocks by means of pairs of virtual resource blocks. A pair of virtual resource blocks is mapped onto a pair of physical resource blocks. The following two types of virtual resource blocks are defined according to their mapping on the physical resource blocks in LTE downlink:

Localised Virtual Resource Block (LVRB)
Distributed Virtual Resource Block (DVRB)

In the localised transmission mode using the localised VRBs, the eNB has full control which and how many resource blocks are used, and should use this control usually to pick resource blocks that result in a large spectral efficiency. In most mobile communication systems, this results in adjacent physical resource blocks or multiple clusters of adjacent physical resource blocks for the transmission to a single user equipment, because the radio channel is coherent in the frequency domain, implying that if one physical resource block offers a large spectral efficiency, then it is very likely that an adjacent physical resource block offers a similarly large spectral efficiency. In the distributed transmission mode using the distributed VRBs, the physical resource blocks carrying data for the same UE are distributed across the frequency band in order to hit at least some physical resource blocks that offer a sufficiently large spectral efficiency, thereby obtaining frequency diversity.

In 3GPP LTE Release 8 there is only one component carrier in uplink and downlink. Downlink control signaling is basically carried by the following three physical channels:

Physical control format indicator channel (PCFICH) for indicating the number of OFDM symbols used for control signaling in a sub-frame (i.e. the size of the control channel region);

Physical hybrid ARQ indicator channel (PHICH) for carrying the downlink ACK/NACK associated with uplink data transmission; and Physical downlink control channel (PDCCH) for carrying downlink scheduling assignments and uplink scheduling assignments.

The PCFICH is sent from a known position within the control signaling region of a downlink sub-frame using a known pre-defined modulation and coding scheme. The user equipment decodes the PCFICH in order to obtain information about a size of the control signaling region in a sub-frame, for instance, the number of OFDM symbols. If the user equipment (UE) is unable to decode the PCFICH or if it obtains an erroneous PCFICH value, it will not be able to correctly decode the L1/L2 control signaling (PDCCH) comprised in the control signaling region, which may result in losing all resource assignments contained therein.

The PDCCH carries control information, such as, for instance, scheduling grants for allocating resources for downlink or uplink data transmission. A physical control channel is transmitted on an aggregation of one or several consecutive control channel elements (CCEs). Each CCE corresponds to a set of resource elements grouped to so-called resource element groups (REG). A control channel element typically corresponds to 9 resource element groups. A scheduling grant on PDCCH is defined based on control channel elements (CCE). Resource element groups are used for defining the mapping of control channels to resource elements. Each REG consists of four consecutive resource elements excluding reference signals within the same OFDM symbol. REGs exist in the first one to four OFDM symbols within one sub-frame. The PDCCH for the user equipment is transmitted on the first of either one, two or three OFDM symbols according to PCFICH within a sub-frame.

Another logical unit used in mapping of data onto physical resources in 3GPP LTE Release 8 (and later releases) is a resource block group (RBG). A resource block group is a set of consecutive (in frequency) physical resource blocks. The concept of RBG provides a possibility of addressing particular RBGs for the purpose of indicating a position of resources allocated for a receiving node (e.g. UE), in order to minimise the overhead for such an indication, thereby decreasing the control overhead to data ratio for a transmission. The size of RBG is currently specified to be 1, 2, 3, or 4, depending on the system bandwidth, in particular, on $N_{RB}^{DL}$. Further details of RBG mapping for PDCCH in LTE Release 8 may be found in 3GPP TS 36.213 "*Evolved Universal terrestrial Radio Access (E-UTRA); Physical layer procedures*", v8.8.0, September 2009, Section 7.1.6.1, freely available at http://www.3gpp.org/ and incorporated herein by reference.

Physical downlink shared channel (PDSCH) is used to transport user data. PDSCH is mapped to the remaining OFDM symbols within one sub-frame after PDCCH. The PDSCH resources allocated for one UE are in the units of resource block for each sub-frame.

FIG. 2 shows an exemplary mapping of PDCCH and PDSCH within a sub-frame. The first two OFDM symbols form a control channel region (PDCCH region) and are used for L1/L2 control signaling. The remaining twelve OFDM symbols form data channel region (PDSCH region) and are used for data. Within a resource block pairs of all sub-frames, cell-specific reference signals, so-called common reference signals (CRS), are transmitted on one or several antenna ports 0 to 3. In the example of FIG. 2, the CRS are transmitted from two antenna ports: R0 and R1. Moreover, the sub-frame also includes UE-specific reference signals, so-called demodulation reference signals (DM-RS) used by the user equipment for demodulating the PDSCH. The DM-RS are only transmitted within the resource blocks in which the PDSCH is allocated for a certain user equipment. In order to support multiple input/multiple output (MIMO) with DM-RS, four DM-RS layers are defined meaning that at most, MIMO of four layers is supported. In this example, in FIG. 2, DM-RS layer 1, 2, 3 and 4 are corresponding to MIMO layer 1, 2, 3 and 4.

One of the key features of LTE is the possibility to transmit multicast or broadcast data from multiple cells over a synchronized single frequency network which is known as multimedia broadcast single frequency network (MBSFN) operation. In MBSFN operation, UE receives and combines synchronized signals from multiple cells. To facilitate this, UE needs to perform a separate channel estimation based on an MBSFN reference signal. In order to avoid mixing the MBSFN reference signal and normal reference signal in the same sub-frame, certain sub-frames known as MBSFN sub-frames are reserved from MBSFN transmission.

The structure of an MBSFN sub-frame is shown in FIG. 3 up to two of the first OFDM symbols are reserved for non-MBSFN transmission and the remaining OFDM symbols are used for MBSFN transmission. In the first up to two OFDM symbols, PDCCH for uplink resource assignments and PHICH can be transmitted and the cell-specific reference signal is the same as non-MBSFN transmission sub-frames. The particular pattern of MBSFN sub-frames in one cell is broadcasted in the system information of the cell. UEs not capable of receiving MBSFN will decode the first up to two OFDM symbols and ignore the remaining OFDM symbols. MBSFN sub-frame configuration supports both 10 ms and 40 ms periodicity. However, sub-frames with number 0, 4, 5 and 9 cannot be configured as MBSFN sub-frames. FIG. 3 illustrates the format of an MBSFN subframe. The PDCCH information sent on the L1/L2 control signaling may be separated into the shared control information and dedicated control information.

The frequency spectrum for IMT-advanced was decided at the World Radio Communication Conference (WRC-07) in November 2008. However, the actual available frequency bandwidth may differ for each region or country. The enhancement of LTE standardized by 3GPP is called LTE-advanced (LTE-A) and has been approved as the subject matter of Release 10. LTE-A Release 10 employs carrier aggregation according to which two or more component carriers as defined for LTE Release 8 are aggregated in order to support wider transmission bandwidth, for instance, transmission bandwidth up to 100 MHz. More details on carrier aggregation can be found in 3GPP TS 36.300 "*Evolved Universal terrestrial Radio Access (E-UTRA) and Universal terrestrial Radio Access Network (E-UTRAN); Overall description*", v10.2.0, December 2010, Section 5.5 (Physical layer), Section 6.4 (Layer 2) and Section 7.5 (RRC), freely available at http://www.3gpp.org/ and incorporated herein by reference. It is commonly assumed that the single component carrier does not exceed a bandwidth of 20 MHz. A terminal may simultaneously receive and/or transmit on one or multiple component carriers depending on its capabilities. A UE may be configured to aggregate a different number of component carriers (CC) in the uplink and in the downlink. The number of downlink CCs which can be configured depends on the downlink aggregation capability of the UE. The number of uplink CCs which can be configured depends on the uplink aggregation capability of the UE. However, it is not possible to configure a UE with more uplink CCs than downlink CCs.

The term "component carrier" is sometimes replaces with the term "cell" since, similar to a concept of a cell known from earlier releases of LTE and UMTS, a component carrier defines resources for transmission/reception of data and may be added/reconfigures/removed from the resources utilized by the wireless nodes (e.g. UE, RN). In particular, a cell is a combination of downlink and optionally uplink resources, i.e. downlink and optional uplink component carrier. In Rel-8/9, there are one carrier frequency of downlink resources and one carrier frequency of uplink resources. The carrier frequency of downlink resources is detected by UE through cell selection procedure. The carrier frequency of uplink resources is informed to UE through System Information Block 2. When carrier aggregation is configured, there are more than one carrier frequency of downlink resources and possibly more than one carrier frequency of uplink resources. Therefore, there would be more than one combination of downlink and optionally uplink resources, i.e. more than one serving cell. The primary serving cell is called Primary Cell (PCell). Other serving cells are called Secondary Cells (SCells).

When carrier aggregation is configured, a UE has only one Radio Resource Control (RRC) connection with the network. Primary Cell (PCell) provides the non-access stratum (NAS) mobility information and security input at RRC connection reestablishment or handover. Depending on UE capabilities, Secondary Cells (SCells) can be configured to form together with the PCell a set of serving cells. RRC connection is the connection between RRC layer on UE side and RRC layer on network side. Establishment, maintenance and release of an RRC connection between the UE and E-UTRAN include: allocation of temporary identifiers between UE and E-UTRAN; configuration of signaling radio bearer(s) for RRC connection, i.e, Low priority SRB and high priority SRB. More details on RRC can be found in 3GPP TS 36.331 "*Evolved Universal terrestrial Radio Access (E-UTRA); Radio Resource Control (RRC); Protocol specification*", v10.0.0, December 2010, freely available at http://www.3gpp.org/ and incorporated herein by reference.

In the downlink, the carrier corresponding to PCell is called Downlink Primary Component Carrier (DL PCC) whereas in the uplink, the carrier corresponding to PCell is called Uplink Primary Component Carrier (UL PCC). The linking between DL PCC and UL PCC is indicated in the system information (System Information Block 2) from the PCell. System information is common control information broadcast by each cell, including, for instance, information about the cell to the terminals. With regard to the system information reception for the PCell, the procedure of LTE in Rel-8/9 applies. The details on system information reception procedure for Rel-8/9 can be found in 3GPP TS 36.331 "*Evolved Universal terrestrial Radio Access (E-UTRA); Radio Resource Control (RRC); Protocol specification*", v9.5.0, December 2010, Section 5.2, freely available at http://www.3gpp.org/ and incorporated herein by reference. In the downlink, the carrier corresponding to an SCell is a Downlink Secondary Component Carrier (DL SCC) while in the uplink it is an Uplink Secondary Component Carrier (UL SCC). The linking between DL SCC and UL SCC is indicated in the system information (System Information Block 2) of the SCell. All required system information of the SCell is transmitted to UE through dedicated RRC signaling when adding an SCell. Hence, there is no need for the UE to acquire system information directly from SCells. The system information of an SCell remains valid as long as the SCell is configured. Changes in system information of an SCell are handled through the removal and addition of the SCell. Removal and/or addition of an SCell can be performed using an RRC procedure.

Both downlink grant and uplink grant are received on DL CC. Therefore, in order to know the uplink grant received on one DL CC corresponds to the uplink transmission of which UL CC, the linking between DL CC and UL CC would be necessary.

A linking between UL CC and DL CC allows identifying the serving cell for which the grant applies:
  downlink assignment received in PCell corresponds to downlink transmission in the PCell,
  uplink grant received in PCell corresponds to uplink transmission in the PCell,
  downlink assignment received in $SCell_N$ corresponds to downlink transmission in the $SCell_N$,
  uplink grant received in $SCell_N$ corresponds to uplink transmission in the $SCell_N$. If $SCell_N$ is not configured for uplink usage by the UE, the grant is ignored by the UE.

3GPP TS 36.212 v10.0.0, also describes in Section 5.3.3.1 the possibility of cross-carrier scheduling, using a Carrier Indication Field (CIF).

UE may be scheduled over multiple serving cells simultaneously. A cross-carrier scheduling with a CIF allows the PDCCH of a serving cell to schedule resources in another serving cell(s), however, with the following restrictions:
  cross-carrier scheduling does not apply to PCell, which means that PCell is always scheduled via its own PDCCH,
  when the PDCCH of a secondary cell (SCell) is configured, cross-carrier scheduling does not apply to this SCell, which means that the SCell is always scheduled via its own PDCCH, and
  when the PDCCH of an SCell is not configured, cross-carrier scheduling applies and such SCell is always scheduled via PDCCH of another serving cell.

Therefore, if there is no CIF, the linking between DL CC and UL CC identifies the UL CC for uplink transmission; if there is CIF, the CIF value identifies the UL CC for uplink transmission.

The set of PDCCH candidates to monitor, where monitoring implies attempting to decode each of the PDCCHs, are defined in terms of search spaces. A UE not configured with a Carrier Indicator Field (CIF) shall monitor one UE-specific search space at each of the aggregation levels 1, 2, 4, 8 on each activated serving cell. A UE configured with a Carrier Indicator Field (CIF) shall monitor one or more UE-specific search spaces at each of the aggregation levels 1, 2, 4, 8 on one or more activated serving cells. If a UE is configured with a CIF, the UE specific search space is determined by the component carrier, which means that the indices of CCEs corresponding to PDCCH candidates of the search space are determined by the Carrier Indicator Field (CIF) value. The carrier indicator field specifies an index of a component carrier.

If a UE is configured to monitor PDCCH candidates in a given serving cell with a given DCI format size with CIF, the UE shall assume that a PDCCH candidate with the given DCI format size may be transmitted in the given serving cell in any UE specific search space corresponding to any of the possible values of CIF for the given DCI format size. It means that if one given DCI format size can have more than one CIF value, UE shall monitor the PDCCH candidates in any UE specific search spaces corresponding to any possible CIF value with that given DCI format.

Further details on configurations of search spaces with and without CIF as defined in LTE-A for PDCCH can be found in 3GPP TS 36.213 "*Evolved Universal terrestrial Radio Access (E-UTRA); Physical Layer procedures*", v10.0.0, December 2010, Section 9.1.1, freely available at http://www.3gpp.org/ and incorporated herein by reference.

Another key feature of the LTE-A is providing relaying functionality by means of introducing relay nodes to the UTRAN architecture of 3GPP LTE-A. Relaying is considered for LTE-A as a tool for improving the coverage of high data rates, group mobility, temporary network deployment, the cell edge throughput and/or to provide coverage in new areas.

A relay node is wirelessly connected to radio access network via a donor cell. Depending on the relaying strategy, a relay node may be part of the donor cell or, alternatively, may control the cells on its own. In case the relay node is a part of the donor cell, the relay node does not have a cell identity on its own, however, may still have a relay ID. In the case the relay node controls cells on its own, it controls one or several cells and a unique physical layer cell identity is provided in each of the cells controlled by the relay. At least, "type 1" relay nodes will be a part of 3GPP LTE-A. A "type 1" relay node is a relaying node characterized by the following:

The relay node controls cells each of which appears to a user equipment as a separate cell distinct from the donor cell.

The cells should have its own physical cell ID as defined in LTE Release 8 and the relay node shall transmit its own synchronization channels, reference symbols etc.

Regarding the single cell operation, the UE should receive scheduling information and HARQ feedback directly from the relay node and send its controlled information (acknowledgments, channel quality indications, scheduling requests) to the relay node.

The relay node should appear as a 3GPP LTE compliant eNodeB to 3GPP LTE compliant user equipment in order to support the backward compatibility.

The relay node should appear differently to the 3GPP LTE eNodeB in order to allow for further performance enhancements to the 3GPP LTE-A compliant user equipments.

FIG. 4 illustrates an example 3GPP LTE-A network structure using relay nodes. A donor eNodeB (d-eNB) 410 directly serves a user equipment UE1 415 and a relay node (RN) 420 which further serves UE2 425. The link between donor eNodeB 410 and the relay node 420 is typically referred to as relay backhaul uplink/downlink. The link between the relay node 420 and user equipment 425 attached to the relay node (also denoted r-UEs) is called (relay) access link.

The donor eNodeB transmits L1/L2 control and data to the micro-user equipment UE1 415 and also to a relay node 420 which further transmits the L1/L2 control and data to the relay-user equipment UE2 425. The relay node may operate in a so-called time multiplexing mode, in which transmission and reception operation cannot be performed at the same time. In particular, if the link from eNodeB 410 to relay node 420 operates in the same frequency spectrum as the link from relay node 420 to UE2 425, due to the relay transmitter causing interference to its own receiver, simultaneous eNodeB-to-relay node and relay node-to-UE transmissions on the same frequency resources may not be possible unless sufficient isolation of the outgoing and incoming signals is provided. Thus, when relay node 420 transmits to donor eNodeB 410, it cannot, at the same time, receive from UEs 425 attached to the relay node. Similarly, when a relay node 420 receives data from donor eNodeB, it cannot transmit data to UEs 425 attached to the relay node. Thus, there is a sub-frame partitioning between relay backhaul link and relay access link.

Regarding the support of relay nodes, in 3GPP it has currently been agreed that:

Relay backhaul downlink sub-frames during which eNodeB to relay downlink backhaul transmission is configured, are semi-statically assigned.

Relay backhaul uplink sub-frames during which relay-to-eNodeB uplink backhaul transmission is configured are semi-statically assigned or implicitly derived by HARQ timing from relay backhaul downlink sub-frames.

In relay backhaul downlink sub-frames, a relay node will transmit to donor eNodeB and consequently r-UEs are not supposed to expect receiving any data from the relay node. In order to support backward compatibility for UEs that are not aware of their attachment to a relay node (such as Release 8 UEs for which a relay node appears to be a standard eNodeB), the relay node configures backhaul downlink sub-frames as MBSFN sub-frames.

In the following, a network configuration as shown in FIG. 4 is assumed for exemplary purposes. The donor eNodeB transmits L1/L2 control and data to the macro-user equipment (UE1) and 410 also to the relay (relay node) 420, and the relay node 420 transmits L1/L2 control and data to the relay-user equipment (UE2) 425. Further assuming that the relay node operates in a time-duplexing mode, i.e. transmission and reception operation are not performed at the same time. Whenever the relay node is in "transmit" mode, UE2 needs to receive the L1/L2 control channel and physical downlink shared channel (PDSCH), while when the relay node is in "receive" mode, i.e. it is receiving L1/L2 control channel and PDSCH from the Node B, it cannot transmit to UE2 and therefore UE2 cannot receive any information from the relay node in such a sub-frame. In the case that the UE2 is not aware that it is attached to a relay node (for instance, a Release-8 UE), the relay node 420 has to behave as a normal (e-)NodeB. As will be understood by those skilled in the art, in a communication system without relay node any user equipment can always assume that at least the L1/L2 control signal is present in every sub-frame. In order to support such a user equipment in operation beneath a relay node, the relay node should therefore pretend such an expected behavior in all sub-frames.

As shown in FIGS. 2 and 3, each downlink sub-frame consists of two parts, control channel region and data region. FIG. 5 illustrates an example of configuring MBSFN frames on relay access link in situation, in which relay backhaul transmission takes place. Each subframe comprises a control data portion 510, 520 and a data portion 530, 540. The first OFDM symbols 720 in an MBSFN subframe are used by the relay node 420 to transmit control symbols to the r-UEs 425. In the remaining part of the sub-frame, the relay node may receive data 540 from the donor eNodeB 410. Thus, there cannot be any transmission from the relay node 420 to the r-UE 425 in the same sub-frame. The r-UE receives the first up to two OFDM control symbols and ignores the remaining part of the sub-frame. Non-MBSFN sub-frames are transmitted from the relay node 420 to the r-UE 525 and the control symbols 510 as well as the data symbols 530 are processed by the r-UE 425. An MBSFN sub-frame can be configured for every 10 ms on every 40 ms. Thus, the relay backhaul downlink sub-frames also support both 10 ms and 40 ms configurations. Similarly to the MBSFN sub-frame configuration, the relay backhaul downlink sub-frames cannot be configured at sub-frames with #0, #4, #5 and #9. Those subframes that are not allowed to be configured as backhaul DL subframes are called "illegal DL subframes". Thus, relay DL backhaul sub-frames can be normal or MBSFN subframe on d-eNB side. Currently it is agreed that relay backhaul DL subframes, during which eNB 410 to relay node 420 downlink backhaul transmission may occur, are semi-statically assigned. Relay backhaul UL subframes, during which relay node 420 to eNB 410 uplink backhaul transmission may occur, are semi-statically assigned or implicitly derived by HARQ timing from relay backhaul DL subframes.

Since MBSFN sub-frames are configured at relay nodes as downlink backhaul downlink sub-frames, the relay node cannot receive PDCCH from the donor eNodeB. Therefore, a new physical control channel (R-PDCCH) is used to dynamically or "semi-persistently" assign resources within the semi-statically assigned sub-frames for the downlink and uplink backhaul data. The downlink backhaul data is transmitted on a new physical data channel (R-PDSCH) and the uplink backhaul data is transmitted on a new physical data channel (R-PUSCH). The R-PDCCH(s) for the relay node is/are mapped to an R-PDCCH region within the PDSCH region of the sub-frame. The relay node expects to receive R-PDCCH within the region of the sub-frame. In time domain, the R-PDCCH region spans the configured downlink backhaul sub-frames. In frequency domain, the R-PDCCH region exists on certain resource blocks preconfigured for the relay node by higher layer signaling. Regarding the design and use of an R-PDCCH region within a sub-frame, the following characteristics have been agreed in standardization:

- R-PDCCH is assigned PRBs for transmission semi-statically. Moreover, the set of resources to be currently used for R-PDCCH transmission within the above semi-statically assigned PRBs may vary dynamically, between sub-frames.
- The dynamically configurable resources may cover the full set of OFDM symbols available for the backhaul link or may be constrained to their sub-set.
- The resources that are not used for R-PDCCH within the semi-statically assigned PRBs may be used to carry R-PDSCH or PDSCH.
- In case of MBSFN sub-frames, the relay node transmits control signals to the r-UEs. Then, it can become necessary to switch transmitting to receiving mode so that the relay node may receive data transmitted by the donor eNodeB within the same sub-frame. In addition to this gap, the propagation delay for the signal between the donor eNodeB and the relay node has to be taken into account. Thus, the R-PDCCH is first transmitted starting from an OFDM symbol which, within the sub-frame, is late enough in order for a relay node to receive it.
- The mapping of R-PDCCH on the physical resources may be performed either in a frequency distributed manner or in a frequency localised manner.
- The interleaving of R-PDCCH within the limited number of PRBs can achieve diversity gain and, at the same time, limit the number of PRBs wasted.
- In non-MBSFN sub-frames, Release 10 DM-RS is used when DM-RS are configured by ENodeB. Otherwise, Release 8 CRS are used. In MBSFN sub-frames, Release 10 DM-RS are used.
- R-PDCCH can be used for assigning downlink grant or uplink grant for the backhaul link. The boundary of downlink grant search space and uplink grant search space is a slot boundary of the sub-frame. In particular, the downlink grant is only transmitted in the first slot and the uplink grant is only transmitted in the second slot of the sub-frame.
- No interleaving is applied when demodulating with DM-RS. When demodulating with CRS, both REG level interleaving and no interleaving are supported.

Relay backhaul R-PDCCH search space is a region where relay node 420 expects to receive R-PDCCHs. In time domain, it exists on the configured DL backhaul subframes. In frequency domain, it exists on certain resource blocks that are configured for relay node 420 by higher layer signaling. R-PDCCH can be used for assigning DL grant or UL grant for the backhaul link.

According to agreements reached in RAN1 about the characteristics of the relay backhaul R-PDCCH in no cross-interleaving case, a UE-specific search space has following properties:

- Each R-PDCCH candidate contains continuous VRBs,
- The set of VRBs is configured by higher layers using resource allocation types 0, 1, or 2,
- The same set of VRBs is configured for a potential R-PDCCH in the first and in the second slot,
- DL grant is only received in 1st slot and UL grant is only received in 2nd slot, and
- The number of candidates for the respective aggregation level $\{1, 2, 4, 8\}$ is $\{6, 6, 2, 2\}$.

R-PDCCH without cross-interleaving means that, an R-PDCCH can be transmitted on one or several PRBs without being cross-interleaved with other R-PDCCHs in a given PRB. In the frequency domain, the set of VRBs is configured by higher layer using resource allocation types 0, 1, or 2 according to Section 7.1.6 of 3GPP TS 36.213 "*Evolved Universal terrestrial Radio Access (E-UTRA); Physical layer procedures*", v8.8.0, September 2009, freely available at http://www.3gpp.org/ and incorporated herein by reference. If the set of VRBs is configured by resource allocation type 2 with distributed VRB to PRB mapping, the provisions in Section 6.2.3.2 of 3GPP TS 36.211 for even slot numbers are always applied. The details can be found in 3GPP TS 36.211, "*Evolved universal terrestrial radio access (E-UTRA); physical channels and modulations (Release 8)*", version 8.9.0, December 2009, Section 6.2, available at http://www.3gpp.org. which is incorporated herein by reference.

FIG. 6 shows the example of R-PDCCH downlink and uplink grant search space for the no cross-interleaved R-PDCCH case. In this example, no carrier aggregation and no cross-carrier scheduling is assumed. In the example, the same VRBs are configured for DL and UL grant search space. DL grant search space is only in the 1st slot and UL grant search space is only in 2nd slot. In particular, FIG. 6 shows schematically a first slot 610 and a second slot 620 in which the rows represent pairs of virtual resource blocks on different sub-carriers (i.e., in the frequency domain). Ellipses of different sizes represent candidates of the respective uplink and the downlink grant search space for different aggregation levels. For instance, the aggregation level 1 candidates 601 cover one VRB, candidates of aggregation level 2, 602, cover 2 VRBs, candidates of aggregation level 4, 604, cover 4 VRB and candidates of aggregation level 8, 608, cover 8 VRBs.

According to agreements reached in RAN1 regarding the R-PDCCH/R-PDSCH multiplexing, the second slot of an R-PDCCH PRB pair can be allocated to data channel for a relay node receiving at least a part of DL grant in the first slot of the PRB pair. In particular, when the relay node receives a resource allocation which overlaps a PRB pair, in which a DL grant is detected in the first slot, the relay node assumes that there is a PDSCH data transmission for it in the second slot of that PRB pair. Otherwise, the relay node assumes that there is no data transmission for it in the second slot of that PRB pair and thus also no change to DCI formats. For an R-PDCCH PRB pair where the relay node detects at least a part of DL grant in the first slot, the relay node shall assume the first slot of the R-PDCCH PRB pair is not used for data transmission.

Based on the above rules, FIG. 7 illustrates various allocation scenarios. In particular, FIG. 7 shows in its part (a) a smaller portion of the downlink and uplink grant search space as also illustrated in FIG. 6. In its parts (b), (c) and (d), FIG. 7 shows examples of the PRB utilization in different downlink and uplink grant allocation cases. In these examples, downlink and uplink grant is assumed to use aggregation level 2 candidates. In the first allocation example (b), only a downlink grant 702 is allocated, thus the second slot can be used for PDSCH 720. In the second allocation example (c), only uplink grant 703 is allocated, thus the corresponding PRBs 730 in the first slot are wasted. In the third allocation example (d), both downlink 741 and uplink 742 grants are allocated, so that they can be allocated in the same PRB pair, and thus no PRBs are wasted.

If carrier aggregation is supported on relay backhaul link, R-PDCCH search space should also be able to support carrier aggregation. In case of no cross-carrier scheduling, there is R-PDCCH region in each Component Carrier (CC). Accordingly, the R-PDCCH search space design applied in a case without carrier aggregation can be reused. However, in case of cross-carrier scheduling, there will be more than one R-PDCCH DL and/or UL grant search spaces in one CC, so that the R-PDCCH search space design cannot be easily reused.

SUMMARY OF THE INVENTION

In view of the above, the aim of the present invention is to provide an efficient scheme for configuring a search space in which control information, which may contain uplink and downlink grants (or assignments) for a shared channel, can be signaled to a receiver, or particularly to a relay node.

This is achieved by the features of independent claims.

Advantageous embodiments of the invention are subject to the dependent claims.

It is the particular approach of the present invention to provide a search space configuration in which the first slot includes search spaces for blind detection of control information for a respective plurality of component carriers and the second slot includes a search space for control information related to a further component carrier, wherein a candidate of the second-slot search space are mapped to a same resource block as a candidate of a search space in the first slot.

In this approach, one UL grant in the second slot can be allocated on the same resource block(s) as one DL grant in the first slot, wherein the UL grant and DL grant can belong the UE specific search spaces that are not linked by system information. It increases the possibility that UL grant and DL grant can be allocated in the same resource block(s), so that the resource block(s) in the first slot or the second slot would not be wasted, which can happen when there is only one UL grant or DL grant in the resource block pair(s).

In accordance with an aspect of the present invention a method is provided for receiving control information within a subframe of a multi-carrier communication system supporting carrier aggregation, the control information being related to different component carriers, the method comprising the following steps performed at a receiving node: receiving a sub-frame from a transmitting node, the sub-frame including a first and a second slot, wherein the sub-frame includes a plurality of resource block pairs in frequency domain on sub-carriers of one component carrier, each pair comprising a resource block of the first slot and a resource block of the second slot; and performing a blind detection for the control information within a first search space in the first slot, within a second search space of the second slot, and within a third search space in the first slot, wherein said first, second and third search spaces being subdivided into respective candidates, each candidate being included in one or more resource blocks, the blind detection being performed for a plurality of candidates, wherein at least one candidate of the first or third search space is on same resource block pair as at least one candidate of the second search space and the first search space is determined by a first component carrier, the second search space is determined by a second component carrier, and the third search space is determined by a third component carrier.

According to another aspect of the present invention, a method is provided for transmitting control information for at least one receiving node within a subframe of a multi-carrier communication system supporting carrier aggregation, the control information being related to different component carriers, the method comprising the following steps performed at the transmitting node: mapping control information space for a receiving node onto a first search space in a first slot, onto a second search space in a second slot and onto a third search space in the first slot, the first and the second slot being comprised in the sub-frame, wherein the sub-frame includes a plurality of resource block pairs in frequency domain on sub-carriers of one component carrier, each pair comprising a resource block of the first slot and a resource block of the second slot, the search spaces comprising resources on which receiving node is to perform a blind detection, said first, second and third search spaces being subdivided into respective candidates, each candidate being included in one or more resource blocks, the blind detection being performed for a plurality of candidates, wherein at least one candidate of the first or third search space is on same resource block pair as at least one candidate of the second search space and the first search space is determined by a first component carrier, the second search space is determined by a second component carrier, and the third search space is determined by a third component carrier; and transmitting the subframe to the at least one receiving node. For the present invention, the pairs of resource blocks may be pairs of physical resource blocks which are a result of localized or distributed mapping of VRBs on PRBs as described above for the LTE system. For instance, in DVRB mapping, i.e. distributed VRB to PRB mapping, it is possible that the VRB pair is not on the same sub-carriers. In the localized mapping, the pair of PRBs after VRB mapping shares same sub-carriers. As also described in the background section, control information is included in resource blocks, in particular in its portions such as CCEs or aggregations of a plurality of CCEs. CCEs which are to be monitored by the receiving node form candidates of possibly different sizes (called aggregation levels). The candidates to be monitored form a search space of a receiving node. Here the CCE is not restricted to the CCE definition in Rel-8/9/10, which has fixed number of REs. Here the CCE may be the aggregation unit of the control information. It can be the CCE in Rel-8/9/10; it can also be the REs available in one resource block for the control information transmission.

In accordance with an embodiment of the present invention, a candidate are candidates of aggregation level (also called "size") 1, 2, 4, or 8 and/or the first slot carries signaling information related to scheduling of a downlink component carrier and the second slot carries signaling information to scheduling of an uplink component carrier.

Advantageously, the first slot of a sub-frame includes a plurality of search spaces related to a plurality of component carriers, and the candidates of the second search space in the second slot are configured in such a way that for each search space from said plurality of search spaces in the first slot, at least one candidate of the second search space is mapped on same resource block pair as a candidate of said search space from said plurality of search spaces.

In particular, the candidates of the second search space mapped onto resource block pairs of different search spaces of the first slot are shifted by different amounts of resource blocks with respect to the start of the respective search space of the first slot.

Moreover, the candidates of the second search space in the second slot may be distributed with respect to the search spaces of the first slot in such a way that the number of candidates with a predefined size mapped on each search space of the first slot is same.

Alternatively, the candidates of the second search space in the second slot are distributed with respect to the search spaces of the first slot in such a way that a number of candidates with a predefined size mapped on the first search space is higher than a number of candidates with said predefined size mapped on another search space in the first slot.

Still alternatively, the candidates of the second search space in the second slot are distributed with respect to the search spaces of the first slot in such a way that at least one candidate of each size is mapped on a search space in the first slot related to a component carrier linked with the second carrier in the system information.

According to an embodiment of the present invention, the candidates of the second search space in the second slot are mapped successively in the resource block domain.

According to an embodiment of the present invention, all candidates of the second search space are mapped on same pairs of resource blocks as candidates of the first search space.

Advantageously, the method according to claim 6, wherein the candidates of the second search space in the second slot are distributed with respect to the search spaces of the first slot in accordance with a format of the control information in such a way that at least two candidates of the second search space are for signaling different formats of the control information.

In particular, the receiving node is a relay node, transmitting node may be a donor eNodeB in a 3GPP LTE based system, and the physical downlink control channel may be R-PDCCH without physical resource block interleaving in time domain.

According to a further aspect of the present invention, a receiving apparatus is provided for receiving a control information within a subframe of a multi-carrier communication system supporting carrier aggregation, the control information being related to different component carriers, the receiving apparatus comprising: a receiving unit for receiving a sub-frame from a transmitting node, the sub-frame including a first and a second slot, wherein the sub-frame includes a plurality of resource block pairs in frequency domain on sub-carriers of one component carrier, each pair comprising a resource block of the first slot and a resource block of the second slot; and a detecting unit for performing a blind detection for the control information within a first search space in the first slot, within a second search space of the second slot, and within a third search space in the first slot, wherein said first, second and third search spaces being subdivided into respective candidates, each candidate being included in one or more resource blocks, the blind detection being performed for a plurality of candidates, wherein at least one candidate of the first or third search space is on same resource block pair as at least one candidate of the second search space and the first search space is determined by a first component carrier, the second search space is determined by a second component carrier, and the third search space is determined by a third component carrier.

According to still another aspect of the present invention, a transmitting apparatus is provided for transmitting control information for at least one receiving node within a subframe of a multi-carrier communication system supporting carrier aggregation, the control information being related to different component carriers, the transmitting apparatus comprising: a mapping unit for mapping control information space for a receiving node onto a first search space in a first slot, onto a second search space in a second slot and onto a third search space in the first slot, the first and the second slot being comprised in the sub-frame, wherein the sub-frame includes a plurality of resource block pairs in frequency domain on sub-carriers of one component carrier, each pair comprising a resource block of the first slot and a resource block of the second slot, the search spaces comprising resources on which receiving node is to perform a blind detection, said first, second and third search spaces being subdivided into respective candidates, each candidate being included in one or more resource blocks, the blind detection being performed for a plurality of candidates, wherein at least one candidate of the first or third search space is on same resource block pair as at least one candidate of the second search space and the first search space is determined by a first component carrier, the second search space is determined by a second component carrier, and the third search space is determined by a third component carrier; and a transmitting unit for transmitting the subframe to the at least one receiving node.

According to yet another aspect of the present invention, a channel structure is provided for carrying control information for at least one receiving node within a subframe of a multi-carrier communication system supporting carrier aggregation, the control information being related to different component carriers, the sub-frame including a first and a second slot, wherein the sub-frame includes a plurality of resource block pairs in frequency domain on sub-carriers of one component carrier, each pair comprising a resource block of the first slot and a resource block of the second slot; and wherein control information is mapped on a first search space in the first slot, on a second search space of the second slot, and on a third search space in the first slot, said first, second and third search spaces being logically subdivided into respective candidates, each candidate being included in one or more resource blocks, wherein at least one candidate of the first or third search space is on same resource block pair as at least one candidate of the second search space and the first search space is determined by a first component carrier, the second search space is determined by a second component carrier, and the third search space is determined by a third component carrier.

In accordance with another aspect of the present invention, a computer program product comprising a computer-readable medium having a computer-readable program code embodied thereon is provided, the program code being adapted to carry out the present invention.

The above and other objects and features of the present invention will become more apparent from the following description and preferred embodiments given in conjunction with the accompanying drawings in which:

FIG. 23 is a table summarizing the efficiency of resource allocation for selected search space configurations;

FIG. 24 is a table summarizing the efficiency of resource allocation for selected search space configurations;

DETAILED DESCRIPTION

Figure 1:
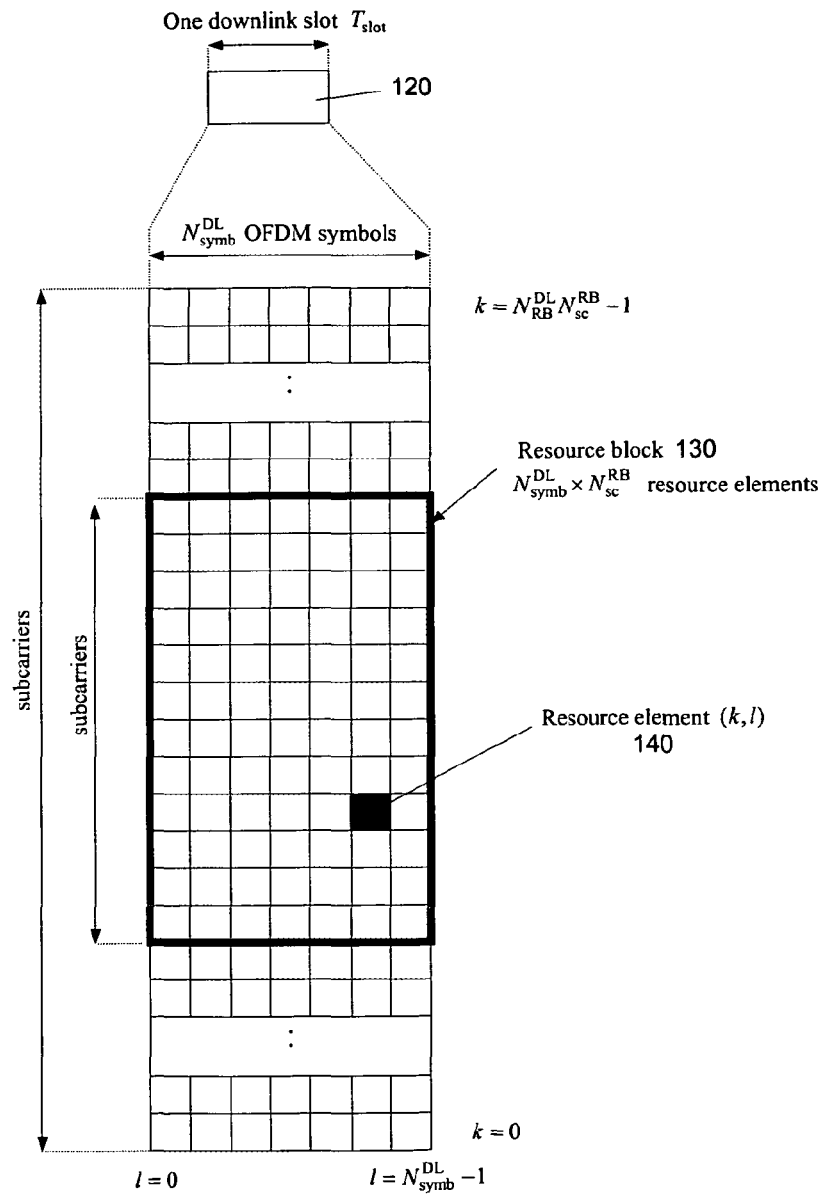
FIG. 1 is a schematic drawing showing an exemplary downlink component carrier of one of two downlink slots of a sub-frame defined for 3GPP LTE release 8.
Figure 2:
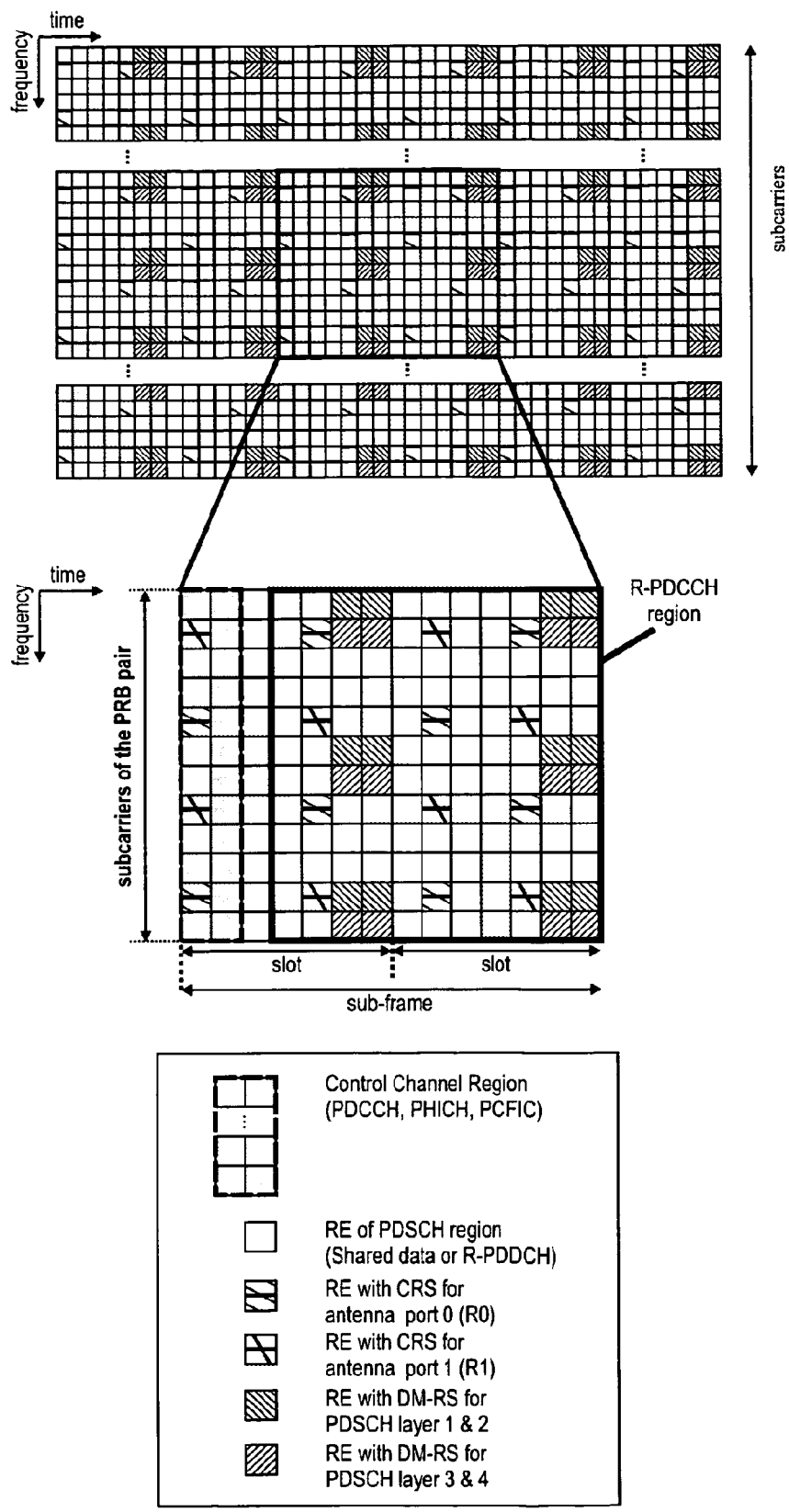
FIG. 2 is a schematic drawing illustrating the structure of a non-MBSFN sub-frames and a physical resource block pair thereof defined for 3GPP LTE release 8 and 3GPP LTE-a release 10.
Figure 3:
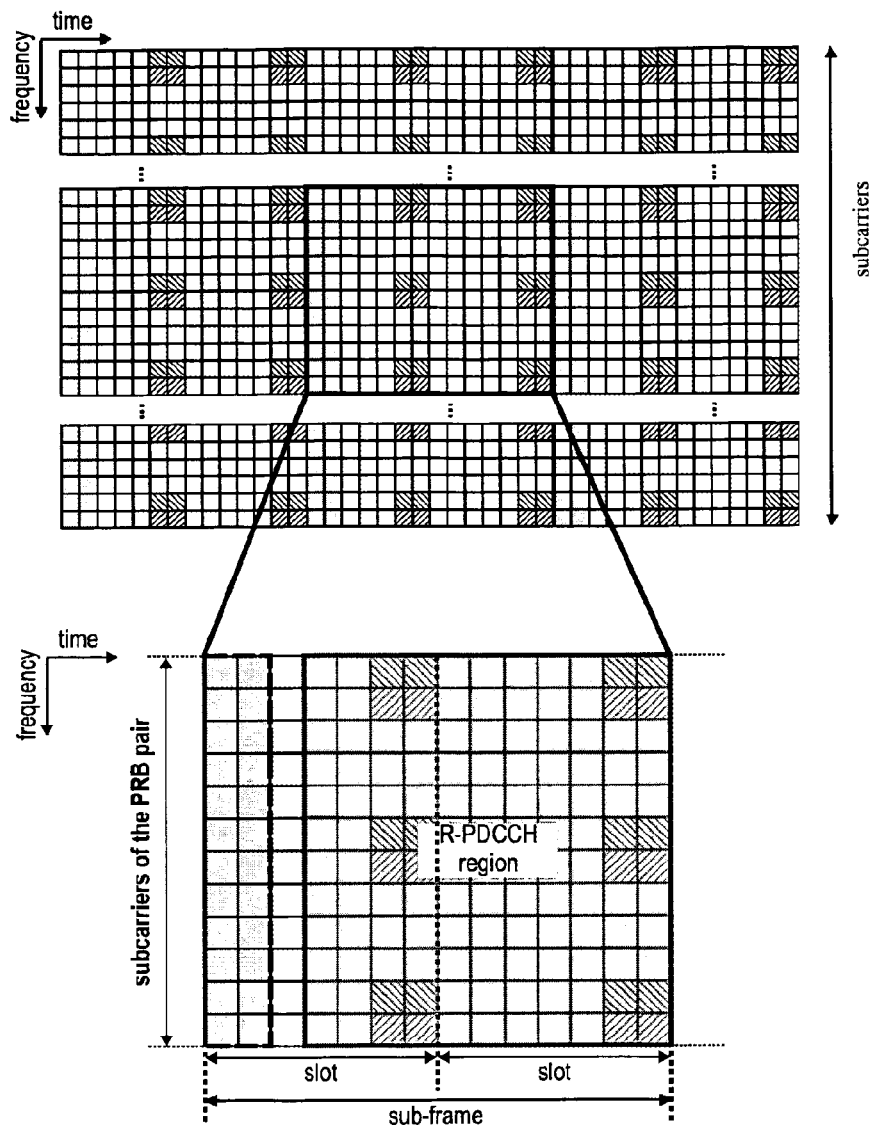
FIG. 3 is a schematic drawing illustrating a structure of MBSFN sub-frames and a physical resource block pair thereof defined for 3GPP LTE Release 8 and 3GPP LTE-A Release 10.
Figure 4:
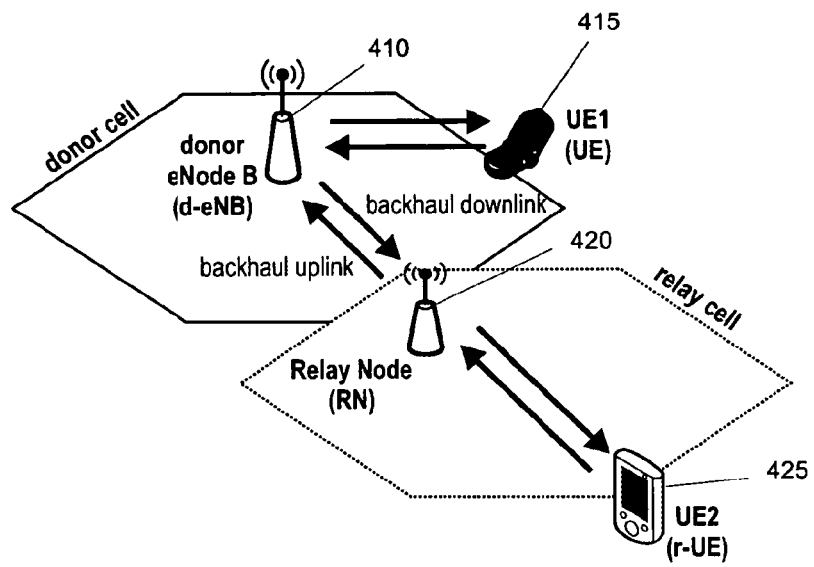
FIG. 4 is a schematic drawing of an exemplary network configuration including a donor eNodeB, a relay node, and two user equipments.
Figure 5:
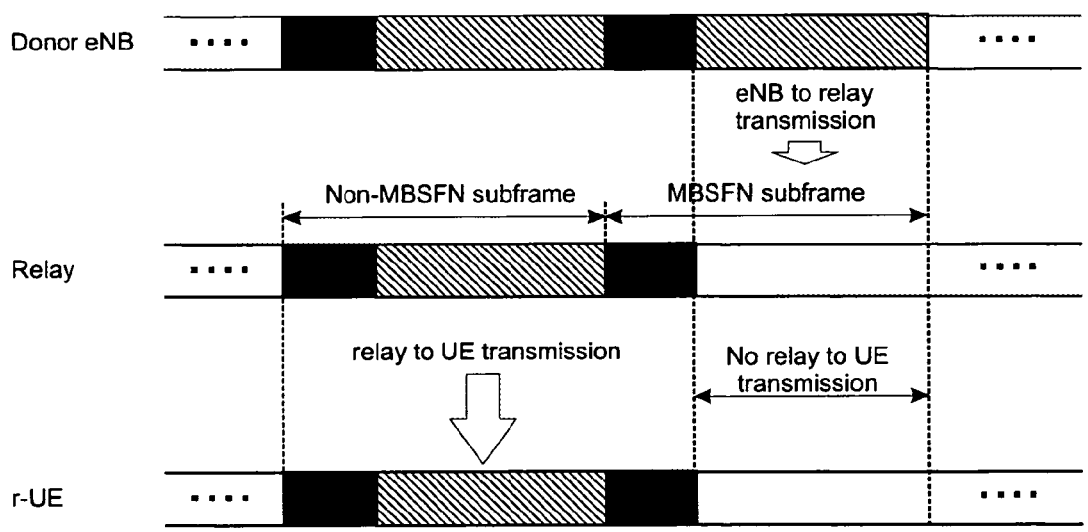
FIG. 5 is a schematic drawing illustrating an example of a structure of a relay backhaul downlink sub-frame configurations used in 3GPP LTE-A Release 10.

The aim of the present invention is to provide configuration of a search space for blind detection of a control information in a system supporting carrier aggregation.

This is achieved by providing a first and a third search space in a first slot of a subframe and a second search space in a second slot of the subframe, wherein the candidates for blind detection in these search spaces are arranged in such a way that at least one candidate of the search spaces in the first slot is mapped onto a same resource block pair as a candidate from the search space in the second slot.

The first slot may be for search spaces determined by downlink component carriers, the second slot may be for one or more search space determined by the uplink component carrier(s).

In particular, the present invention is suitable for a system in which a subframe includes two slots in time domain, each slots including a plurality of OFDM symbols in time domain and the slots being defined in the frequency domain on a plurality resource blocks, each of which including a plurality of subcarriers. The candidates for blind detection are resource elements defined within resource blocks on one or more subcarriers and one or more OFDM symbols. A candidate may be included within a plurality of physical resource blocks, or in a single physical resource block. Here, the term "included" means that it is allocated some resource element(s) within the resource block(s).

The search space is determined by a component carrier, meaning that the candidates of such a search space are monitored when blindly detecting control information for such component carrier. The location of the search space is also decided by the component carrier. It is possible that the search spaces of different component carriers totally or partly overlap with each other. One candidate may also carry control information for different component carriers.

The receiving and the transmitting nodes may be any two nodes in a network. For instance, the receiving node may be a terminal and the transmitting node may be a network node such as a base station in a mobile communications system. Alternatively, or in addition, the receiving node may be a relay node and the transmitting node may be a network node such as a base station.

A system supporting carrier aggregation in general refers to a system in which a multicarrier communication such as OFDM communication may run parallel on a multiple component carriers, each of which has its own resource grid including subcarriers of the OFDM system in frequency domain and symbols in time domain. Therefore, the component carriers are sometimes also referred to as cells, since they have independent own set of resources. One cell is a combination of one downlink component carrier and possible one uplink component carrier. Each cell has its own cell ID and system information. A UE can have a set of active serving cells. The cell can be activated and deactivated by higher layer signaling.

The following paragraphs will describe various embodiments of the present invention. For exemplary purposes only, most of the embodiments are outlined in relation to an OFDM downlink radio access scheme according to 3GPP LTE (Release 8) and LTE-A (Release 10) mobile communication systems discussed in the Technical Background section above. It should be noted that the invention may be advantageously used for example in connection with a mobile communication system such as 3GPP LTE (Release 8) and LTE-A (Release 10) communication systems previously described, but the invention is not limited to its use in this particular exemplary communication network. The aspects of the invention described herein may be inter alia used for defining the search spaces for uplink and downlink control information (R-PDCCH), mainly carrying assignments and grants for receivers such as relay nodes or UEs in a 3GPP LTE-A (Release 10)

communication systems and for providing an effective resource utilization in terms of R-PDCCH data being mapped to a downlink search space (in particular to individual resource blocks and resource block groups thereof). The explanations given in the Technical Background section above are intended to better understand the mostly 3GPP LTE (Release 8) and LTE-A (Release 10) specific exemplary embodiments described herein and should not be understood as limiting the invention to the described specific implementations of processes and functions in the mobile communication network. Specifically, it can be applied to the communication between two non-mobile nodes of a communication network, such as between a stationary eNodeB and a stationary relay node.

Moreover, the first search space may refer to a DL SCC search space, the second search space may refer to an UL PCC search space, and the third space may refer to a DL PCC search space as shown in the following.

Figure 8:
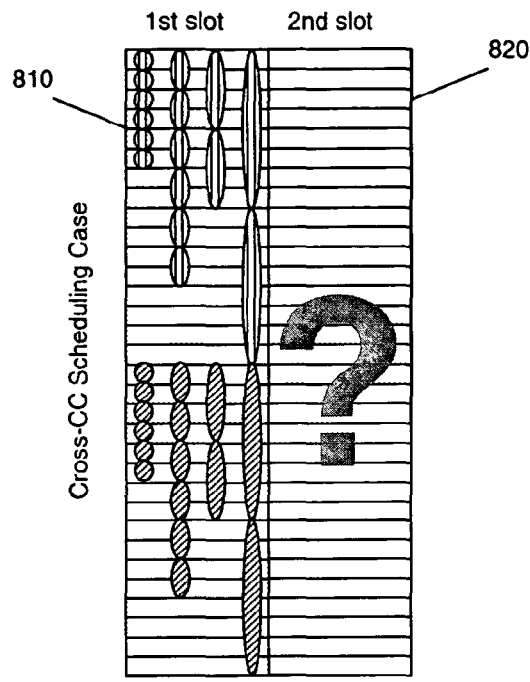
FIG. 8 is a schematic drawing illustrating an example of a downlink grant search space in case of cross-CC scheduling.

FIG. 8 shows portion of the first slot 810 and the second slot 820 for the case in which cross component carrier scheduling applies. In this example, two downlink component carriers, namely, DL PCC and DL SCC, as well as one uplink component carrier, namely UL PCC are scheduled on DL PCC. It is assumed that the downlink grant search spaces for the respective two DL component carriers are configured separately. The two downlink grant search spaces for DL PCC and DL SCC are configured without any overlapping. However, it is noted that these two downlink grant search spaces may be also configured with partial overlaps or even complete overlaps depending on the network implementation. The problem is how to configure search space in the second slot 820 for UL PCC.

Figure 6:
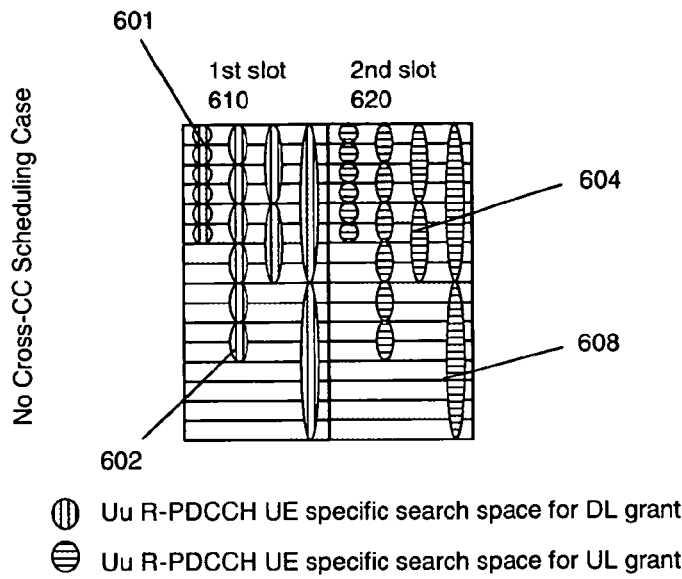
FIG. 6 is a schematic drawing representing a downlink and an uplink grant search space in case of no cross-CC scheduling.
Figure 9:
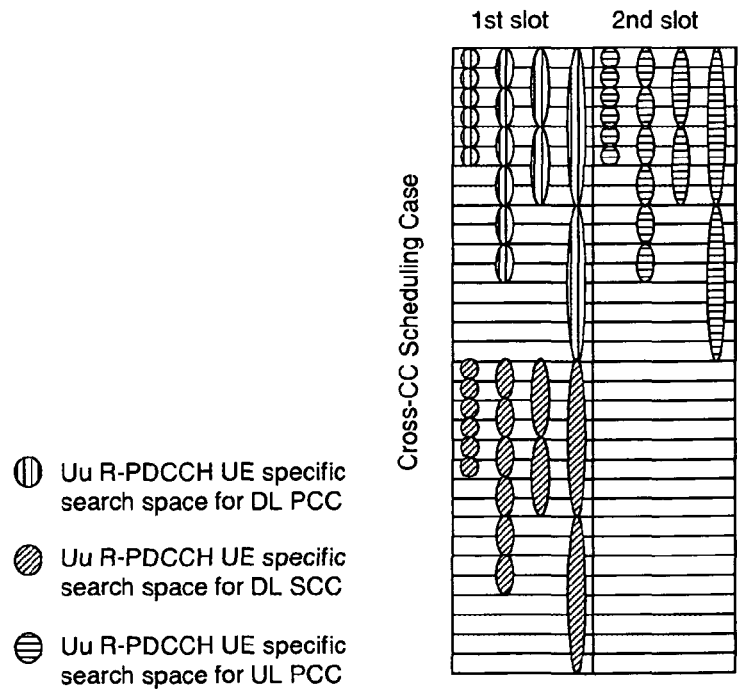
FIG. 9 is a schematic drawing showing an example of an uplink grant search space configuration for the downlink grant search space configuration of FIG. 8 in case of downlink and uplink PCCs linked by system information.

One possible solution is to align downlink and uplink grant search spaces of the downlink and uplink component carriers, which are linked by the system information. An example of such a configuration is shown in FIG. 9. In this example, it is assumed that the DL PCC is linked to UL PCC by the system information. On the DL PCC, downlink grant for DL PCC, downlink grant for DL SCC, and uplink grant for UL PCC are scheduled. In FIG. 9, the uplink grant search space for UL PCC shares the same virtual resource blocks as the downlink grant search space for DL PCC. This solution is similar to the solution without cross component carrier scheduling as illustrated in FIG. 6. Also similarly, such solution leads to wasting of resources depending on the particular allocation case.

Figure 10:
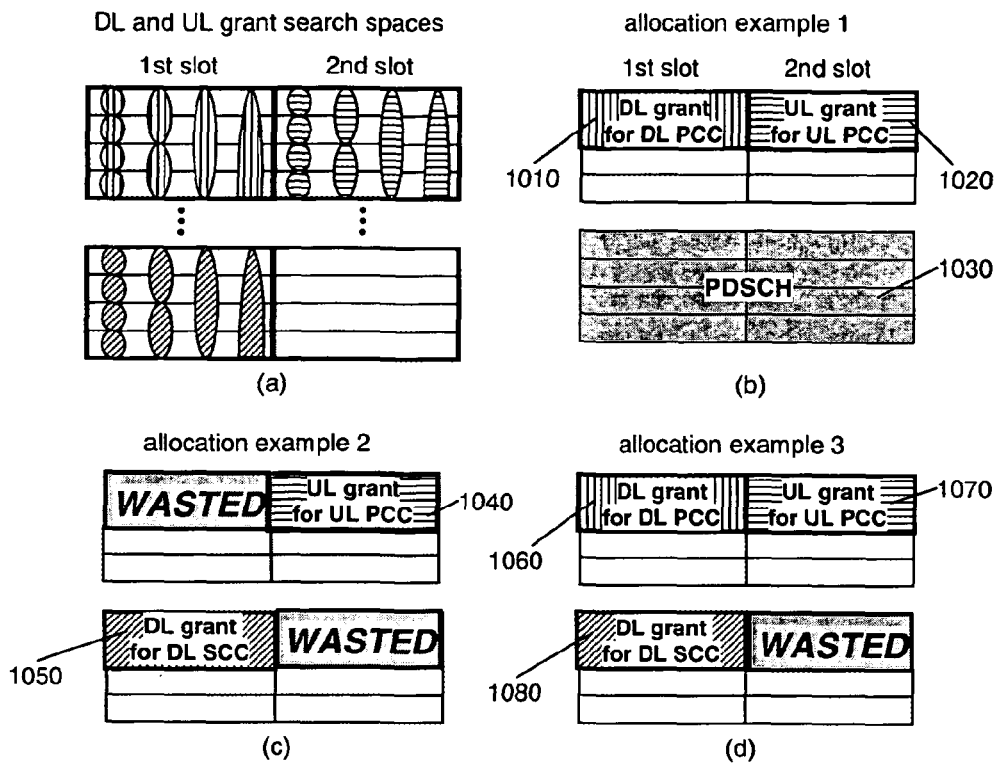
FIG. 10 is a schematic drawing illustrating resource allocation possibilities in different downlink/uplink grant allocation scenarios for search space configuration of FIG. 9.

FIG. 10 illustrates example allocation scenarios for aggregation level 2 candidates in both, downlink and uplink grant space. In particular, part (a) of FIG. 10 illustrates a portion of the first slot and the second slot corresponding to the configuration already shown in FIG. 9. Part (b) of FIG. 10 illustrates a case in which downlink PCC and uplink PCC candidates of aggregation level 2 share the same VRBs. In the example (b), DL SCC is not allocated. Thus, no resources are wasted and PDSCH 1030 is allocated instead. Part (c) of FIG. 10 shows an example in which uplink grant 1040 is scheduled for UL PCC and downlink grant 1050 is scheduled for DL SCC. Consequently, using the configuration of the downlink and uplink grant search space is shown in part (a) of FIG. 10, two VRBs in the first and two VRBs in the second slot are wasted. Another allocation scenario is shown in part (d) of FIG. 10. In particular, downlink grant 1060 for DL PCC, uplink grant 1070 for UL PCC and downlink grant 1080 for DL SCC is configured. As can be seen, this configuration leads to wasting of two VRBs in the second slot.

In order to avoid wasting of resources, in accordance with an embodiment of the present invention, the uplink grant search space of an uplink component carrier is distributed among the downlink grant search spaces of all downlink component carriers as much as possible. Preferably, some uplink grant search space candidates share the same virtual resource blocks with downlink grant candidates of one downlink component carrier and some uplink grant candidates share the same virtual resource blocks with the downlink grant candidates of another downlink component carrier. In this way, an uplink grant can be allocated within the same PRB pair as the downlink grant from all downlink component carriers.

Figure 11:
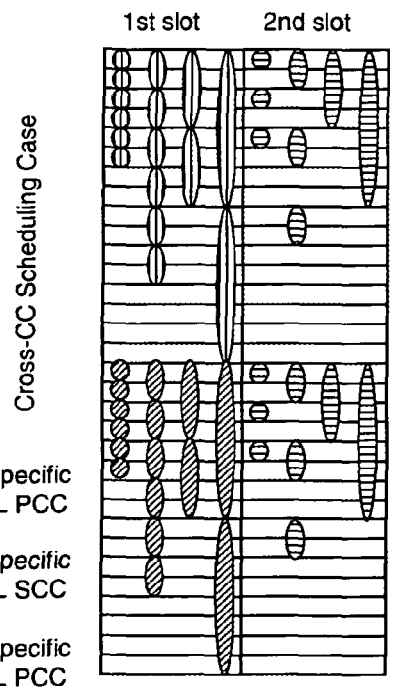
FIG. 11 is a schematic drawing illustrating a distributed uplink grant search space configuration according to an embodiment of the present invention for the downlink grant search space configuration of FIG. 8.

An example of such a configuration of search space is shown in FIG. 11. The first slot is similar to the first slot of FIG. 9, namely, the search spaces for DL PCC and DL SCC are not overlapping. Regarding the second slot, the search space candidates for UL PCC is distributed among the downlink grant search spaces for DL PCC and DL SCC. It is assumed in this example that the downlink grant search spaces for DL PCC and DL SCC are separately configured. The configuration of UL PCC search space results in the number of uplink grant candidates of aggregation level $\{1, 2, 4, 8\}$ within each downlink grant search space being $\{3, 3, 1, 1\}$. Since the uplink grant can be allocated on the same physical resource block pair as the downlink grant from almost all downlink components carriers, the probability of wasting PRBs in the first slot (case in which only uplink grant is allocated) and wasting PRBs in the second slot (case in which only downlink grant for component carriers other than PCC is allocated) is reduced.

Figure 7:
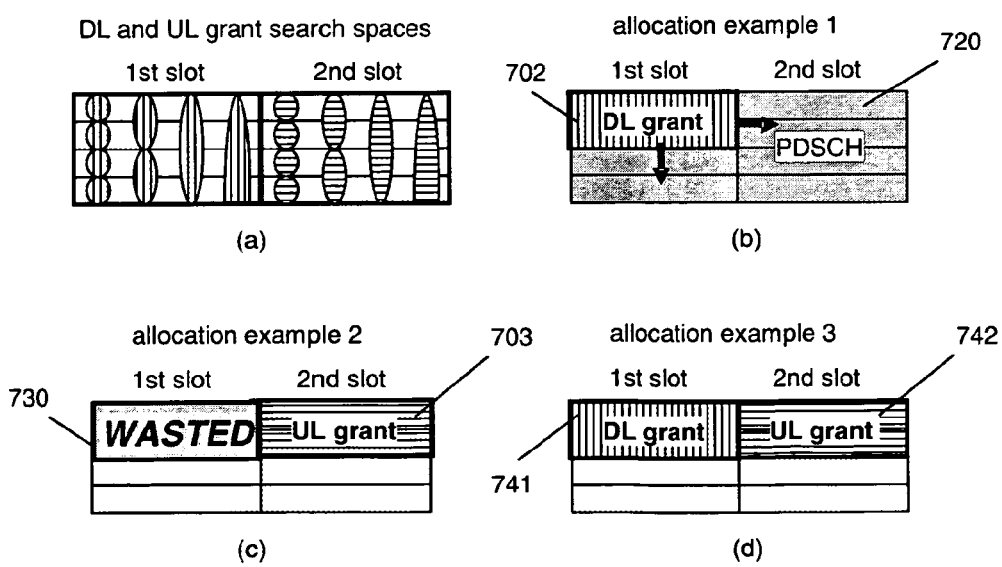
FIG. 7 is a schematic drawing illustrating resource allocation possibilities in different downlink/uplink grant allocation scenarios for no cross-CC scheduling.

As can be seen in FIG. 11, the UL PCC candidate share resource blocks with both, DL PCC and DL SCC candidates. In particular, the UL PCC candidates also share physical resource blocks with DL SCC, which is not linked with the UL PCC over the system information. As can be seen from the example shown in FIG. 7, when downlink grant and uplink grant cannot be allocated on the same PRB pairs, PRBs in the first slot and/or PRBs in the second slot are wasted depending on the particular allocation. Therefore, uplink grant candidates of each aggregation level are distributed among the downlink grant search spaces of all downlink component carriers as much as possible, in order to increase the chance of locating uplink grant candidates in the same PRB pair as downlink grant candidates. Based on this underlying concept, rules for defining the distribution of uplink grant candidates among the downlink grant search spaces may be defined.

In particular, in accordance with an embodiment of the present invention, the uplink grant candidates may be distributed starting with the DL PCC search space and continuing with DL SCC1 and DL SCC2 search space, etc., depending on number of SCCs. However, since the second slot of the downlink grant for DL PCC can be allocated for PDSCH, it is more efficient in view of the resource usage to locate uplink grant candidate within the downlink grant space for DL SCC rather than for DL PCC. Therefore, it is advantageous when DL SCC has a higher priority than DL PCC when distributing the UL PCC search space. In particular, it is beneficial when the uplink grant search space candidates share same PRBs with the SCCs rather than with the PCC with which the UL PCC is linked through the system information.

Based on the above considerations, a basic rule for mapping the grant search spaces is:

1. the uplink grant candidates of each level are distributed among downlink grant search spaces of possibly all downlink component carriers.
2. DL SCC has higher priority than the DL PCC when deciding which candidates of the UL PCC will share PRBs with candidates of downlink search space.

FIG. 11 illustrates an example of two search spaces for respective two downlink component carriers and one uplink component carrier scheduled on one downlink component carrier. In this example, the uplink grant candidates of each aggregation level can be evenly distributed between the downlink grant search spaces of the two downlink component carriers, namely, DL PCC and DL SCC.

Figure 12:
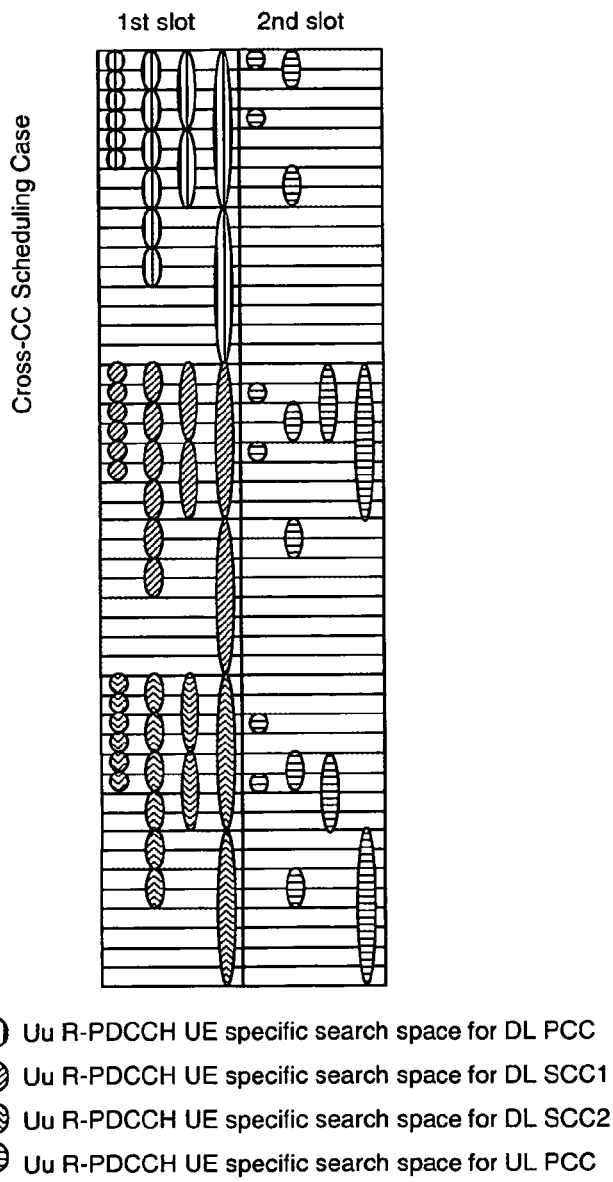
FIG. 12 is a schematic drawing illustrating a distributed uplink grant search space configuration according to an embodiment of the present invention for a downlink grant search space configuration including two 3 CCs.

FIG. 12 illustrates another example in which there are three downlink component carrier grant search spaces and one uplink component carrier search space, all scheduled on one downlink component carrier (DL PCC). The six respective uplink grant candidates of aggregation level 1 and 2 can be evenly distributed among the downlink grant search spaces of the three downlink component carriers similarly to the example of FIG. 11. However, it is assumed that there are only two candidates of aggregation level 4 and 8 in the uplink grant search space. Therefore, they cannot be distributed evenly among the three downlink component carrier search spaces. According to the above indicated rules, DL SCCs have the higher priority than the DL PCC and therefore, the uplink grant candidate of aggregation level 4 and 8 are mapped to share VRBs with candidates of the downlink grant search spaces of DL SCC1 and DL SCC2, leaving out the DL PCC. Accordingly, the uplink grant search space candidates preferably share PRBs with downlink component carrier search space candidates or DL SCCs that are not linked with the UL PCC in the system information.

The configuration shown in FIG. 12 also provides another benefit. In order to achieve a higher frequency scheduling gain in case of localised allocation, the uplink grant candidates within one downlink grant search space are distributed in frequency domain. In particular, the uplink grant candidates within the VRBs of DL SCC search spaces are shifted in positions compared with the uplink grant candidates within the VRBs of the DL PCC search space. Such a distribution provides the benefit, especially in cases when DL PCC search space and DL SCC search space totally overlap. In such a case, the candidates of UL PCC within the VRBs of each downlink component carrier search space shall not totally overlap with each other.

Figure 13:
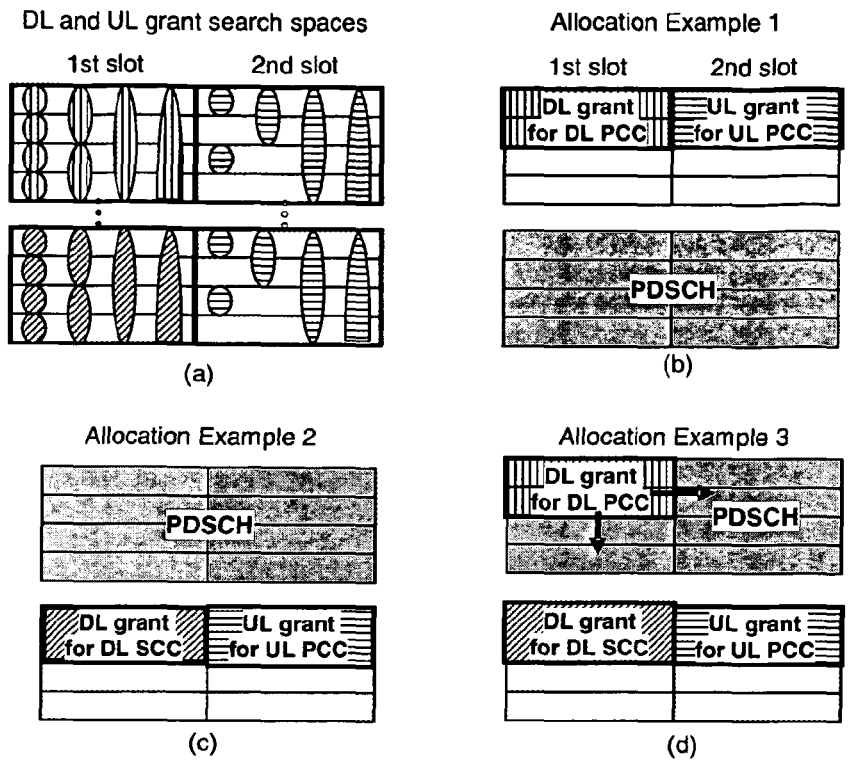
FIG. 13 is a schematic drawing illustrating resource allocation possibilities in different downlink/uplink grant allocation scenarios for search space configuration of FIG. 11.

FIG. 13 illustrates the advantages of distributing uplink grant candidates among the VRBs of the downlink component carrier search spaces. In particular, part (a) of FIG. 13 illustrates a portion of the first slot and the second slot with search space configuration as described with reference to FIG. 11. As in previous examples, it is assumed that candidates of aggregation level 2 are allocated. Part (b) of FIG. 13 illustrates the case in which uplink grant can be allocated in the same PRB pairs as downlink grant for DL PCC. In this case, similarly to the example of FIG. 10, no PRBs are wasted and PDSCH may be allocated. Part (c) of FIG. 13 corresponds to an allocation example (c) of FIG. 10 in that there is a downlink grant for DL SCC and an uplink grant for UL PCC allocated. However, Part (c) of FIG. 13 shows that when using the configuration of the search space in accordance with FIG. 11, the uplink grant can be allocated in the same PRB pairs as downlink grant for DL SCC. Accordingly, no PRBs are wasted. Finally, part (d) of FIG. 13 shows an allocation example similar to the example described in part (d) of FIG. 10. In particular, downlink grant for DL PCC, downlink grant for DL SCC and uplink grant for UL PCC are allocated. With the configuration of the uplink search space as described with reference to FIG. 11, the second slot of downlink grant for DL PCC can be allocated PDSCH and the uplink grant can be allocated in the same PRB pairs as downlink grant for DL SCC. Consequently, also in this case, there are no PRBs wasted. Summarising, when comparing different allocation examples of FIG. 10 with those of FIG. 13, the configuration of the search space according to FIG. 9 results in wasting of 6 PRBs. On the other hand, the configuration as described with reference to FIG. 11 does not result in any wasting of PRBs.

As described above, FIG. 12 also provides a benefit of higher frequency diversity of the mapped search space candidates for UL PCC. However, such a benefit is not limited to the configuration of search spaces with three DL CCs according to FIG. 12.

Figure 14:
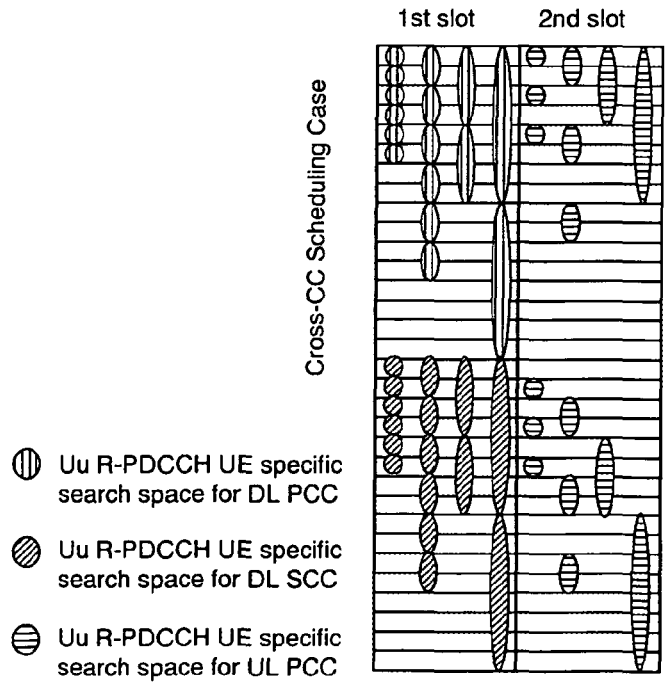
FIG. 14 is a schematic drawing representing a distributed and shifted uplink grant search space configuration for the downlink grant search space configuration according to an embodiment of the present invention for the configuration of downlink CCs search spaces of FIG. 8.

FIG. 14 illustrates two separately configured search spaces for DL PCC and DL SCC in the first slot and search space for UL PCC distributed between the search spaces of the DL PCC and DL SCC. In addition, the uplink grant candidates of each aggregation level within the VRBs of the DL SCC search space are shifted in positions compared with the uplink grant candidates of the same respective aggregation level within the VRBs of the DL PCC search space.

Figure 15:
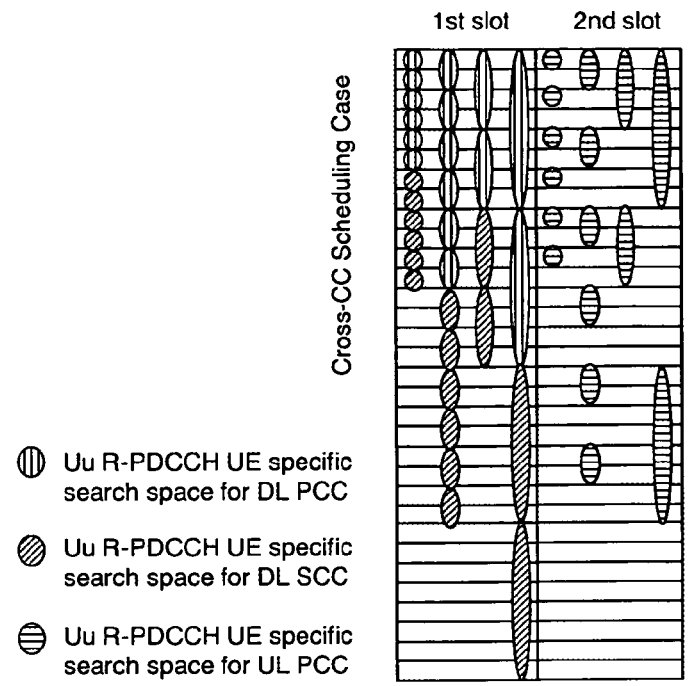
FIG. 15 is a schematic drawing illustrating a distributed uplink grant search space configuration according to an embodiment of the present invention for two consecutive downlink grant search spaces.

All the examples described with reference to FIGS. 8 to 14 assumed separately configured downlink grant search spaces for each of the downlink component carriers (DL PCC, DL SCC1, DL SCC2, . . . ). However, the downlink grant search spaces do not necessarily have to be separately configured. Alternatively, the downlink grant search spaces of the downlink component carriers may be consecutive in the VRB domain. This would be similar to the release-10 PDCCH in the cross-carrier scheduling case. Such a configuration is shown in FIG. 15. The candidates of DL PCC and DL SCC of each aggregation level are consecutive in the VRB domain in the first slot. When following the underlying concept of the present invention, namely, distributing of the uplink grant candidates of the UL PCC to possibly all downlink component carrier search spaces, the uplink grant candidates are to be distributed in the VRB domain in order to share the VRBs with some DL PCC candidates and some DL SCC candidates. An example of such a configuration is shown in FIG. 15 in the second slot. As can be seen in FIG. 15, the distribution follows the same rules as described above for the separate configuration of downlink grant search spaces for DL PCC and DL SCC. In particular, the aggregation level 1 candidates of UL PCC are evenly distributed with respect to the aggregation level 1 candidates of DL PCC and DL SCC. In a similar manner, aggregation level 2 candidates are distributed evenly over the aggregation level 2 candidates of DL PCC and DL SCC. For aggregation level 4 and 8 candidates, FIG. 15 shows that one aggregation level 4 candidate of UL PCC shares VRBs with one aggregation level candidate of DL PCC whereas another UL PCC candidate of aggregation level 4 shares VRBs with another aggregation level 4 candidate of DL SCC. Similarly, aggregation level 8 candidates are distributed.

It is noted that although the above examples show distributing the candidates of the UL PCC search space in the VRB domain within the second slot possibly uniformly with respect to the candidates of the downlink search spaces, the present invention is not limited to such a search space configuration. Alternatively, the distribution may be performed only for candidates of a specific aggregation level. Alternatively or in addition, within one aggregation level only a part of the candidates may be distributed. In order to reduce probability of wasting the resource blocks, high degree of distribution is advantageous. However, other configuration may be more beneficial for a particular system architecture.

Figure 16:
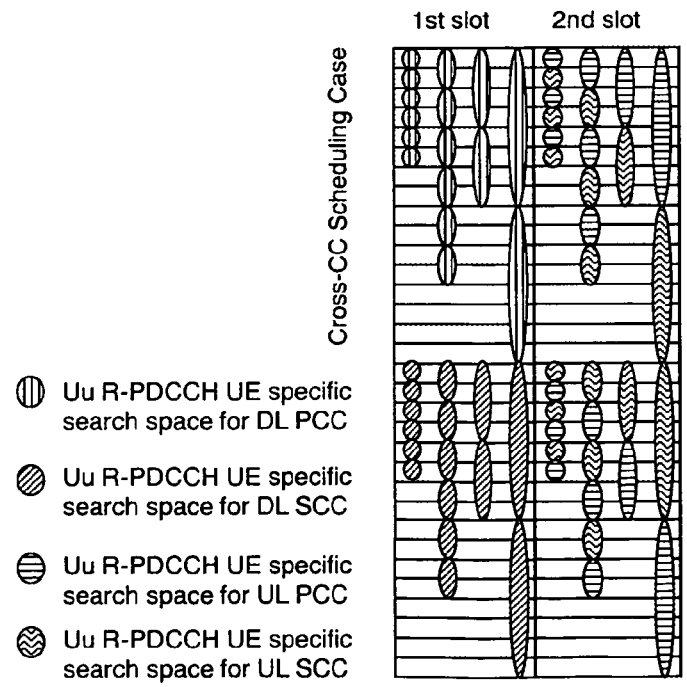
FIG. 16 is a schematic drawing illustrating two distributed uplink grant search spaces according to an embodiment of the present invention for the downlink grant search space configuration of FIG. 8 in case of symmetric uplink and downlink CCs.

The present invention is also applicable for symmetric uplink and downlink component carrier case. FIG. 16 illustrates an example of two downlink component carrier and two uplink component carrier search spaces provided on one downlink component carrier. As can be seen in FIG. 16, DL PCC and DL SCC search spaces are separately configured. The uplink grant candidates for UL PCC are distributed among the downlink PCC and downlink SCC search spaces. Similarly, the uplink grant candidates for UL SCC are distributed between the DL PCC and DL SCC search spaces. In this configuration, the candidates for UL PCC and UL SCC are interleaved with the VRBs of the downlink component carrier search space for each aggregation level. In particular, within the VRBs of the DL PCC search space, the mapping starts with an uplink grant candidate for UL PCC followed by an uplink grant candidate for UL SCC for each aggregation level. Within the VRBs of DL SCC search space, the mapping starts with an uplink grant candidate for UL SCC followed by an uplink grant candidate for UL PCC for each aggregation level. This shift between the respective UL grant candidates provides the advantage that in case the DL grant search spaces for DL PCC and DL SCC totally overlap with each other, the number of UL grant candidates for each uplink component carrier does not need to be reduced. As can be seen on this example, the present invention is also applicable to the symmetric downlink and uplink component carrier configuration in which the number of downlink and uplink component carriers is equal. This is achieved by providing more possibilities for allocation of downlink grant for each downlink component carrier with the same PRB pairs as the uplink grant for each uplink component carrier.

In the previous example it was assumed that DL PCC and UL PCC are linked by the system information. However, the present invention is not limited thereto and is also applicable in the case that the search spaces are not linked by the system information as will be shown below.

In general, the number of wasted resource blocks is reduced when the uplink search space for an UL CC shares resource block pairs with a downlink search space for a DL CC with which the UL CC is not linked via system information.

Figure 17:
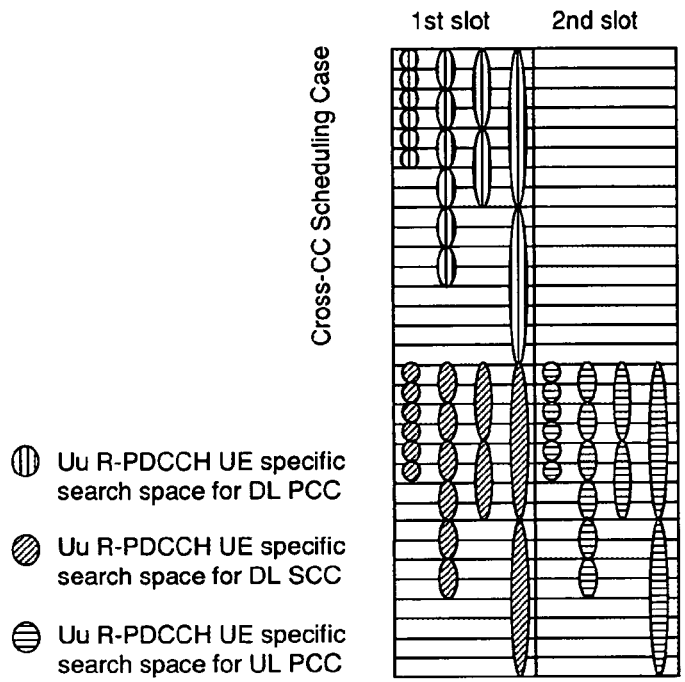
FIG. 17 is a schematic drawing an uplink grant search space configuration according to an embodiment of the present invention for the downlink grant search space configuration of FIG. 8.

According to an embodiment of the present invention, downlink and uplink grant search spaces of a DL CC and an UL CC are aligned, wherein the DL CC and the UL CC are not linked by system information. A corresponding example is shown in FIG. 17. In particular, a DL grant for DL PCC, a DL grant for DL SCC, and an UL grant for UL PCC are scheduled on DL PCC. It is assumed in this example that the DL PCC and the UL PCC are linked according to system information. Accordingly, uplink grant search space for UL PCC shares the same VRBs as downlink grant search space for DL SCC.

Figure 18:
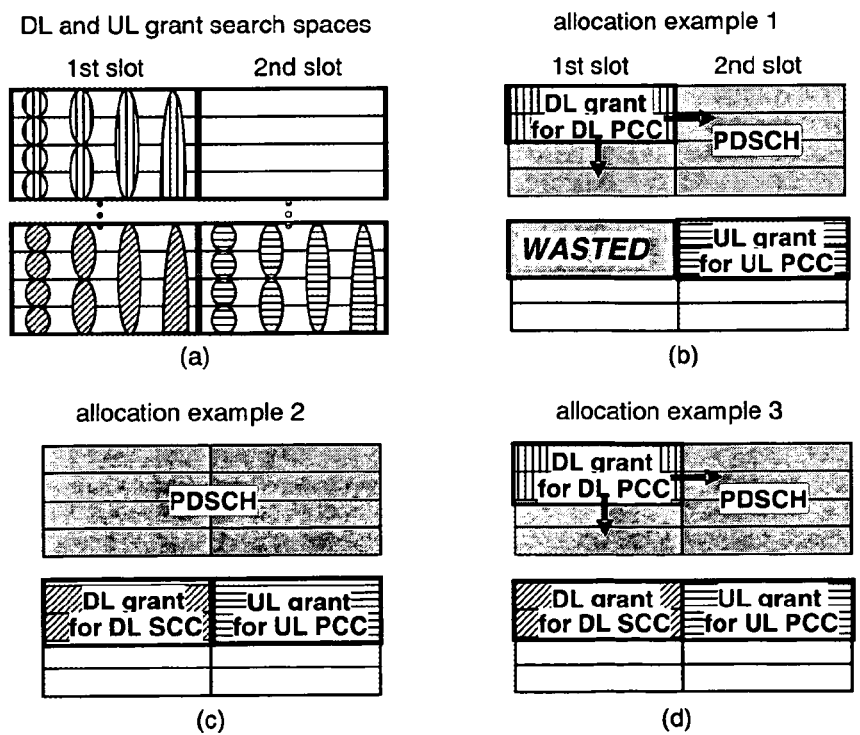
FIG. 18 is a schematic drawing illustrating resource allocation possibilities in different downlink/uplink grant allocation scenarios for search space configuration of FIG. 17.

FIG. 18 illustrates some benefits of this embodiment of the present invention. Part (a) of FIG. 18 shows a portion of the configuration of search space according to FIG. 17. In the first allocation example (b), downlink grant is allocated for DL PCC and an uplink grant is allocated for the UL PCC. In such an example, two PRBs are wasted since uplink grant search space does not share PRB pair with the search space for DL PCC. Another allocation example (c) shows a case in which downlink grant for DL SCC and uplink grant for UL PCC are allocated. In this case, no PRB is wasted. Similarly, in the third allocation example (d), in which downlink grant is allocated for DL PCC as well as for DL SCC and an uplink grant is allocated for UL PCC, no PRBs are wasted. Thus, when compared to the solution described with reference to FIGS. 9 and 10 which wasted 6 PRBs, now only two PRBs are wasted when comparing similar allocation scenarios.

Figure 19:
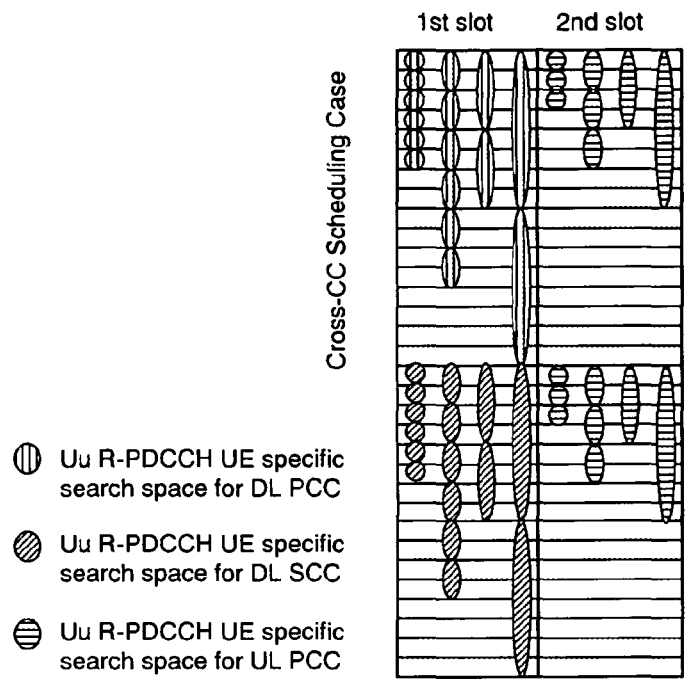
FIG. 19 is a schematic drawing representing a distributed uplink grant search space configuration according to an embodiment of the present invention for the downlink grant search space configuration of FIG. 8.

Another embodiment of the present invention is illustrated in FIG. 19. As can be seen in the figure, in this example the downlink search spaces are configured separately. The uplink grant search space candidates are distributed with respect to the downlink search spaces and mapped consecutively onto the PRBs of the second slot for each aggregation level. Thus, the uplink grant candidates for UL PCC share the same VRBs with the first several downlink grant candidates of each DL CC (in this case DL PCC and DL SCC). It is noted that in this example, again, an equal number of uplink search space candidates is distributed to the downlink search spaces. However, the present invention is not limited thereto and the candidates may be distributed in such a way that there are more candidates sharing VRBs with a downlink search space of one CC than of another CC.

Figure 20:
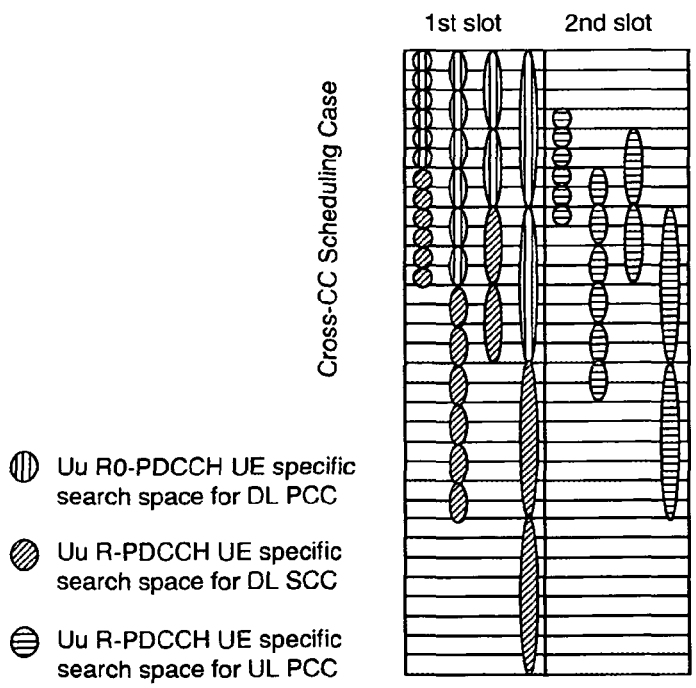
FIG. 20 is a schematic drawing illustrating a distributed uplink grant search space configuration according to an embodiment of the present invention two consecutive downlink grant search spaces.

FIG. 20 illustrates another example, where the downlink grant candidates of each DL CC are consecutive in VRB domain, and also all the uplink grant candidates for UL PCC are consecutive in VRB domain. The benefit of this variant is that the uplink grant candidates are consecutive. Consecutive uplink grant candidates are more aligned with the Release-10 PDCCH design. As can be seen from FIG. 20, even if the uplink grant search space is continuous (without spaces), the uplink candidates are still distributed between the search spaces for the uplink component carriers within each aggregation level. However, the present invention is not limited thereto and, in general, a configurations are also possible in which only candidates on one or a plurality of selected aggregation levels are distributed in this way.

Figure 21:
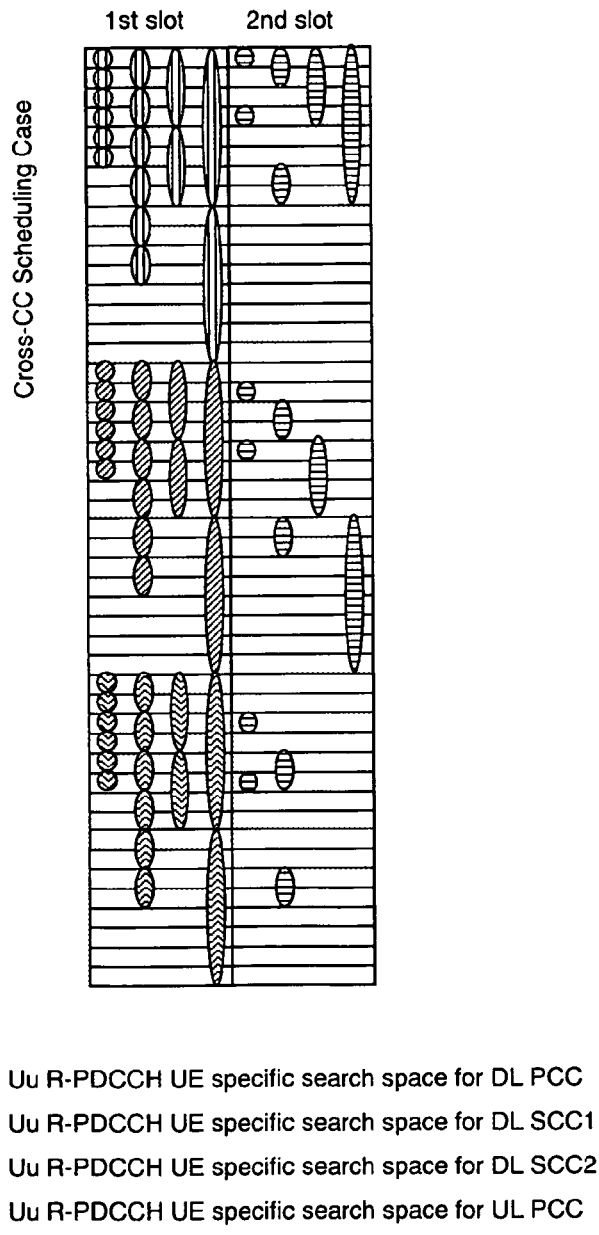
FIG. 21 is a schematic drawing illustrating a distributed and shifted uplink grant search space configuration for three downlink grant search spaces according to an embodiment of the present invention.

FIG. 21 shows an example, which is somewhat similar to the example described with reference to FIG. 12. However, in the example of FIG. 21 at least one uplink grant candidate of each aggregation level shares the same VRBs with a DL grant candidate for DL PCC. There are three DL CCs configured separately and one UL CC, all scheduled on one DL CC. There are only two uplink grant candidates of aggregation level 4 and 8. According to this embodiment of the present invention, one UL grant candidate of aggregation levels 4 and 8 will share the same VRBs with downlink grant candidates of the corresponding aggregation levels for DL PCC. The other uplink grant candidates of aggregation levels 4 and 8 may be allocated within the VRBs for DL SCC1 or DL SCC2. The present invention is not limited to the configuration shown in FIG. 21. In particular, the level 4 uplink search space candidates may be distributed to DL PCC and DL SCC1 whereas the level 8 uplink search space candidates may be distributed to DL PCC and DL SCC2 or vice versa. Other configurations are also possible. FIG. 21, similarly to FIG. 12 shows shifting of the uplink search space candidates with respect to the begin of the downlink search spaces in order to achieve higher frequency diversity gain. However, the present invention is also applicable without such shifting.

One of the benefits of the embodiment described with reference to FIG. 21 is that the uplink grant can always be allocated on the VRBs shared with DL PCC search space. Accordingly, during the reconfiguration of DL CCs and the reconfiguration of the cross component carrier scheduling procedures, uplink grant can still be scheduled because the uplink grant candidates within the VRBs for DL PCC will not be changed.

Figure 22:
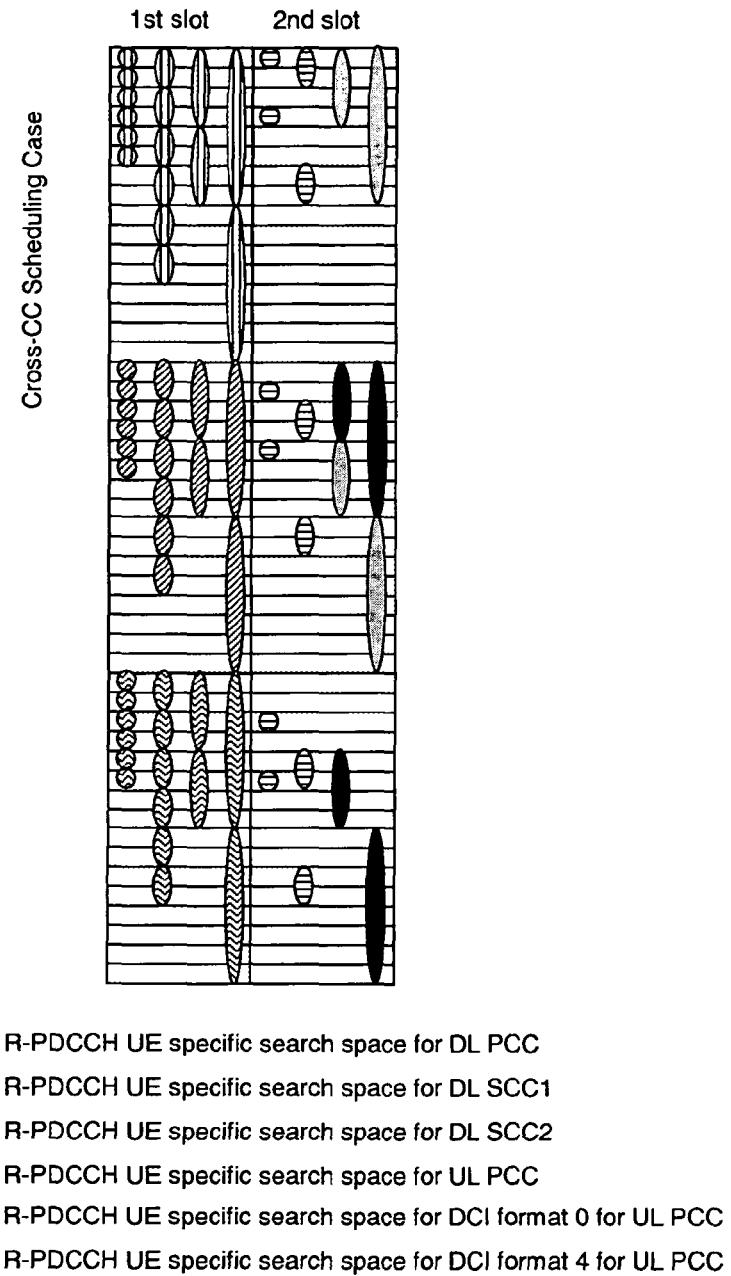
FIG. 22 is a schematic drawing illustrating a distributed uplink grant search space taking into account DCI according to an embodiment of the present invention for three downlink grant search spaces.

FIG. 22 illustrates another embodiment of the present invention. The configuration of the downlink search spaces for the respective three component carriers DL PCC, DL SCC1, and DL SCC2 is similar to the configuration shown in FIG. 21. However, in this embodiment, different uplink grant candidates are assigned for different values of the uplink DCI format. For example, since DCI format 0 is more likely used for a default mode, which can be used during reconfiguration of DL CCs and the reconfiguration of the cross component carrier scheduling procedure, at least one UL grant candidate for DCI format 0 of each aggregation level is sharing VRBs of the DL PCC search space. Other uplink grant candidates for DCI format 0 of each aggregation level are assigned to VRBs of DL SCC search spaces. In order to save PRB resources, for uplink grant candidates for DCI format 4, DL PCC search space has higher priority than DL SCC search space. As shown in FIG. 22, two UL grant candidates for DCI format 0 of aggregation level 4 and 8 are assigned to VRBs of DL PCC and SCC1 search spaces, two UL grant candidates for DCI format 4 of aggregation level 4 and 8 are assigned to VRBs of DL SCC1 and SCC2 search spaces. However, this embodiment is not limited to the example shown in FIG. 22. In particular, it is possible to take into account the DCI format only for the aggregation level 4 or aggregation level 8, or for another aggregation level, or for a plurality of aggregation levels.

The examples described in FIGS. 12, 21, and 22 all show examples in which there are three search spaces in the first slot. In such a case, when the number of second-slot candidates of a particular size is even, the candidate of that size cannot be evenly distributed with respect to the three search spaces. Moreover, in these examples it is assumed that there are only 2 candidates of aggregation level (size) 4. Consequently, the two candidates of size 4 can only be mapped onto respective two of the three search spaces (related to the respective two carriers). The same applies for aggregation level 8.

In accordance with the embodiment described with reference to FIG. 12, mapping onto secondary sub-carrier has priority. The priority may be reflected in the configuration of the search space in different ways. For instance, there may be more candidates of the same size mapped on an SCC search space than on the PCC search space. More specifically, there may even be zero candidates of a particular size on the PCC, while there are some candidates of the same size on one or more SCCs.

Alternatively, the embodiment described with reference to FIG. 21 shows another approach according to which the PCC has priority. Similarly, the priority may be demonstrated in a search space configuration in various ways. For instance, at least one UL CC candidate of each aggregation level is mapped onto same subcarriers as candidates of DL PCC. Alternatively, the number of UL CC candidates of a certain size mapped onto DL PCC is higher than the number of candidates mapped on one or more DL SCCs. The number of candidates mapped on any of SCCs may also be zero.

Both prioritizing approaches have their advantages as described above. Particular configuration of the search spaces may be selected accordingly with regard to the desired system configuration.

The example described with reference to FIG. 22 provides in addition a possibility to specify different UL CC search space configurations for different downlink control information formats.

An advantage of the embodiment described with reference to FIG. 22 is that an uplink grant can still be scheduled during reconfiguration procedure, using DCI format 0. At the same time, if DCI format 4 is normally used, wasted PRBs can be reduced because uplink grant candidates share the same VRBs with DL grant candidates for DL SCCs.

FIGS. 23 and 24 include tables summarizing improvements achievable by various embodiments of the present invention for candidate aggregation level 2.

In particular, table of FIG. 23 lists the number of wasted PRBs for a search space configuration including two downlink search spaces for respective two DL CCs and one uplink search space for an UL CC. In the table, it is assumed that both downlink grant and uplink grant use aggregation level 2. The first column describes the assumed downlink search space allocation and the second column describes the uplink search space allocation. In particular, "0" means that DL/UL CC is not scheduled whereas "1" means that DL/UL CC is scheduled. The third column lists number of wasted PRBs for the configuration described with reference to FIG. 9. The fourth column lists number of wasted PRBs for the configuration described with reference to FIG. 17. The last column lists number of wasted PRBs for the configuration described with reference to FIG. 11. As can be seen from the table, the solution of FIG. 11 wastes no PRBs in more cases than the other two solutions. The solution of FIG. 17 wasted no PRBs in more cases than the solution of FIG. 9. The solution of FIG. 11 also gains in terms of average and maximum number of PRBs wasted when compared with the other two solutions. The solution of FIG. 17 solution also performs better than the Solution of FIG. 9 also in terms of average and maximum number of PRBs wasted.

Table of FIG. 24 provides a more comprehensive list of wasted PRBs for different numbers of downlink and uplink component carriers. The first column indicates the number of DL CCs. The second column indicates the number of UL CCs. The third column lists average number of wasted PRBs for the solution of FIG. 9. The fourth column lists average number of wasted PRBs for the solution of FIG. 17. The last column lists average number of wasted PRBs for the solution of FIG. 11. The average in tables of FIGS. 23 and 24 is calculated over the three possible allocation configurations (as referred to in FIGS. 10, 13, and 18). Each row is one configuration of the number of downlink and uplink component carriers. For each configuration, a table as the table of FIG. 23 can be formed. The table lists all the possible allocations of downlink grant and uplink grant, excluding the case of no uplink grant allocated. Because if there is no uplink grant allocated, the mapping solution of uplink grant search space will not help. For each possible allocation, the number of wasted PRBs is counted. The average number of wasted PRBs is the average over all possible allocations.

As can be seen from the table, in all cases, the main solution described with reference to FIG. 11 provides benefit over the other two solutions. In asymmetric downlink and uplink component carrier cases, the solution described with reference to FIG. 11 always works better the solution of FIG. 9. It should be noted that the solutions described with reference to FIGS. 12 to 16 and 19 to 22 provide same benefit, caused by distributing the uplink search space candidates to different downlink search spaces, as the solution described with reference to FIG. 11.

In general, the search space configured in accordance with any embodiment of the present invention may be configured fixedly, statically, semi-statically or dynamically. In view of the LTE system embodiments discussed above, the transmitting node may be the donor eNodeB 410 and receiving node a relay node 420. The search space configuration in terms of candidates assigned to a particular relay node to monitor may be performed dynamically. The search space configuration in terms of resources available to carry R-PDCCH may be configured semi-statically (for instance, by RRC) or fixed. However, the present invention and the above embodiments of configuring the search space are equally applicable to other nodes such as user equipments.

In accordance with an advantageous embodiment of the present invention, the receiving node is a relay node and the transmitting node is an eNodeB, the control information is uplink/downlink grant communicated over R-PDCCH search space configured as described above. Example of steps performed by such receiving and transmitting node are illustrated in FIG. 25.

Figure 25:
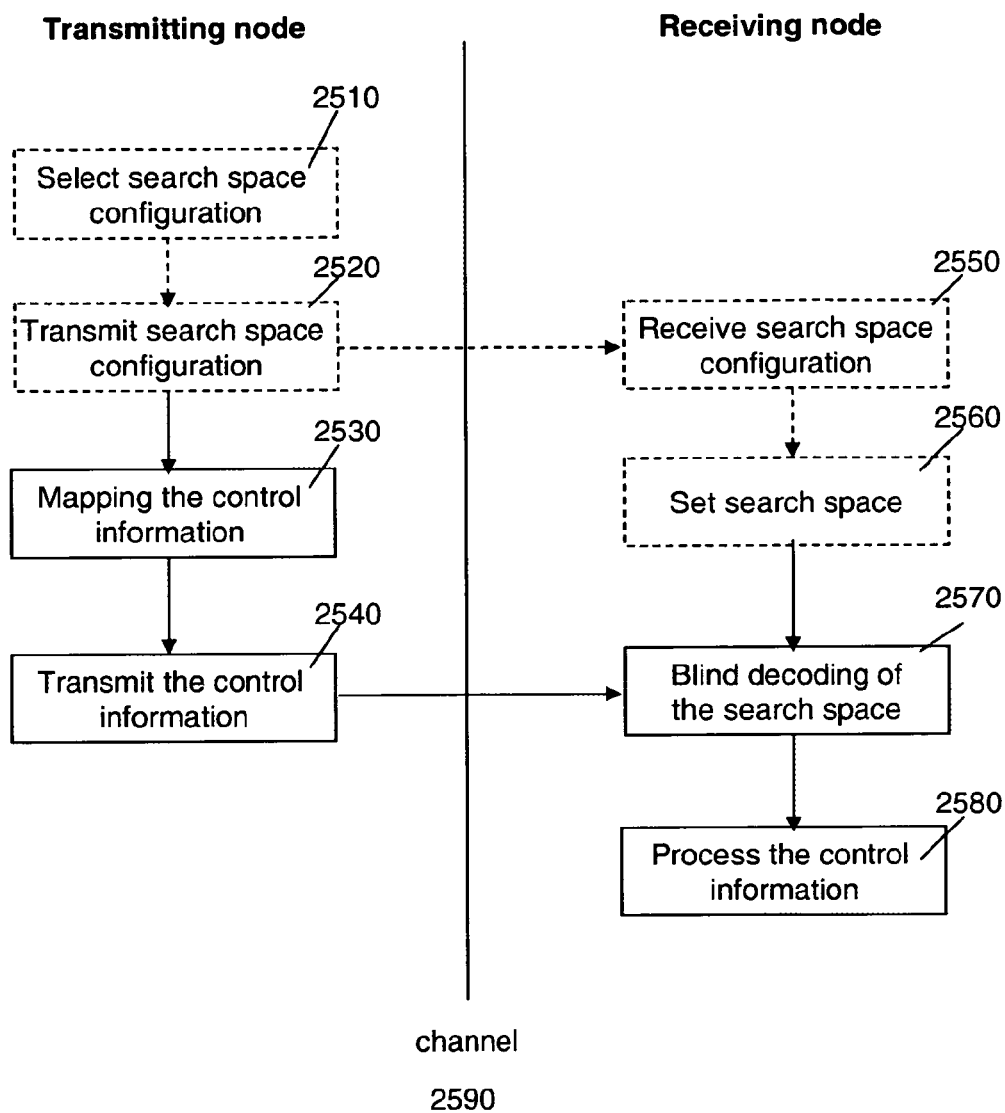
FIG. 25 is a flow chart illustrating transmission and reception of control information between a receiving node and a transmitting node in accordance with an embodiment of the present invention.

In FIG. 25, solid lines represent an embodiment of the present invention in which a transmitting node maps 2530 control information related to the component carriers to be decoded by a receiving node onto a search space. Here, the search space is arranged in accordance with any of the above examples. In particular, the subframes are subdivided into resource units and the control information is blindly decoded from a set of candidates mapped onto the resource units and defining the search space. A candidate may include one or a plurality of the resource units such as control channel elements or any aggregations thereof (aggregation units). As described above, the candidate search spaces related to different component carriers are mapped onto resources in a subframe, namely, onto a first and second slot of the subframe. At least one or more candidates of search spaces in the first slot and in the second slot share same resource block pair, wherein these search spaces in the first and in the second slot relate to respective component carriers that are not linked by the system information, i.e., the resources of which are not linked in the control information broadcast in a cell.

The transmitter maps the control information onto the candidates for the particular receiving node and transmits 2540 it accordingly. The receiving node blindly decodes 2580 the candidates of the configured search space and obtains 2580 therefrom the control information, which is further processed in accordance with its purpose.

As described above, the search space may be, in general, configured fixedly, statically, semi-statically or dynamically. The dashed lines in FIG. 25 illustrate an embodiment of the present invention according to which the transmitting node first selects 2510 a search space configuration (i.e. resources available for mapping of the control channel carrying the control information and/or the candidates which are to be monitored by the particular receiving node). The selected configuration is then signaled 2520 to the receiving node. The receiving node receives 2550 indication of the search space configuration and sets 2560 the search space to be monitored (blindly decoded) accordingly. In general, the receiving node may configure the search space instead of the transmitting node.

In particular, in view of the LTE embodiments discussed above, the transmitting node may be the donor eNodeB 510 and receiving node a relay node 520. The search space configuration in terms of candidates assigned to a particular relay node to monitor may be performed dynamically. The search space configuration in terms of resources available to carry R-PDCCH may be configured semi-statically (for instance, by RRC) or fixed.

Further, the various embodiments of the invention may also be implemented by means of software modules, which are executed by a processor or directly in hardware. Also a combination of software modules and a hardware implementation may be possible. The software modules may be stored on any kind of computer-readable storage media, for example RAM, EPROM, EEPROM, flash memory, registers, hard disks, CD-ROM, DVD, etc.

Most of the embodiments have been outlined in relation to a 3GPP-based architecture of a communication system and the terminology used in the previous sections mainly relates to the 3GPP terminology. However, the terminology and the description of the various embodiments with respect to 3GPP-based architectures are not intended to limit the principles and ideas of the inventions to such systems only. Also the detailed explanations given in the Technical Background section above are intended to better understand the mostly 3GPP specific exemplary embodiments described herein and should not be understood as limiting the invention to the described specific implementations of processes and functions in the mobile communication network. Nevertheless, the concepts and sub-frame structures proposed herein may be readily applied in the architectures described in the Technical Background section. Furthermore, the concept of the invention may be also readily used in the LTE-A RAN currently discussed by the 3GPP.

Summarizing, the present invention relates to transmitting and receiving of control information in a system supporting carrier aggregation. A search space for control information is configured in such a way that at least two search spaces determined by respective component carriers are on a first slot of a subframe and a further search space determined by a further component carrier is on a second slot, wherein at least one candidate of search spaces in the first slot is mapped in a same resource block pair with at least one candidate of a search space in the second slot.

The invention claimed is:

1. A method for receiving control information in a downlink within a sub-frame of a multi-carrier communication system supporting carrier aggregation, the control information being related to different component carriers, the method comprising the following steps performed at a receiving node:
   receiving the sub-frame from a transmitting node, the sub-frame including a first and a second slot, wherein the sub-frame includes a plurality of resource block pairs in frequency domain on sub-carriers of one component carrier, each pair comprising a resource block of the first slot and a resource block of the second slot; and
   performing a blind detection for the control information within a first search space in the first slot, within a second search space of the second slot, and within a third search space in the first slot, wherein said first, second and third search spaces being subdivided into respective candidates, each candidate being included in one or more resource blocks, the blind detection being performed for a plurality of candidates,
   wherein at least one candidate of the first or third search space is on same resource block pair as at least one candidate of the second search space and the first search space is determined by a first component carrier, the second search space is determined by a second component carrier, and the third search space is determined by a third component carrier, and
   wherein the multi-carrier communication system supports carrier aggregation of a plurality of component carriers.

2. The method according to claim 1, wherein
   a candidate is mapped on 1, 2, 4, or 8 resource blocks and/or
   the first slot carries signalling information related to scheduling of a downlink component carrier and the second slot carries signalling information to scheduling of an uplink component carrier.

3. The method according to claim 1, wherein
   the first slot of a sub-frame includes a plurality of search spaces related to the plurality of component carriers, and
   the candidates of the second search space in the second slot are configured in such a way that for each search space from said plurality of search spaces in the first slot, at least one candidate of the second search space is mapped on same resource block pair as a candidate of said search space from said plurality of search spaces.

4. The method according to claim 3, wherein candidates of the second search space mapped onto resource block pairs of different search spaces of the first slot are shifted by different amounts of resource blocks with respect to the start of the respective search space of the first slot.

5. The method according to claim 3, wherein the candidates of the second search space in the second slot are distributed with respect to the search spaces of the first slot in such a way that the number of candidates with a predefined size mapped on each search space of the first slot is same.

6. The method according to claim 5, wherein the candidates of the second search space in the second slot are distributed with respect to the search spaces of the first slot in such a way that a number of candidates with a predefined size mapped on the first search space is higher than a number of candidates with said predefined size mapped on another search space in the first slot.

7. The method according to claim 5, wherein the candidates of the second search space in the second slot are distributed with respect to the search spaces of the first slot in such a way that at least one candidate of each size is mapped on a search space in the first slot related to a component carrier linked with the second carrier in the system information.

8. The method according to claim 5, wherein the candidates of the second search space in the second slot are distributed with respect to the search spaces of the first slot in accordance with a format of the control information in such a way that at least two candidates of the second search space are for signalling different formats of the control information.

9. The method according to claim 1 wherein the candidates of the second search space in the second slot are mapped successively in the resource block domain.

10. The method according to claim 1 wherein all candidates of the second search space are mapped on same pairs of resource blocks as candidates of the first search space.

11. The method according to claim 1, wherein
the receiving node is a relay node, transmitting node is a donor eNodeB in a 3GPP LTE based system, and
the physical downlink control channel is R-PDCCH without physical resource block interleaving in time domain.

12. A method for transmitting control information in a downlink for at least one receiving node within a sub-frame of a multi-carrier communication system supporting carrier aggregation, the control information being related to different component carriers, the method comprising the following steps performed at the transmitting node:
mapping control information space for a receiving node onto a first search space in a first slot, onto a second search space in a second slot and onto a third search space in the first slot, the first and the second slot being comprised in the sub-frame, wherein the sub-frame includes a plurality of resource block pairs in frequency domain on sub-carriers of one component carrier, each pair comprising a resource block of the first slot and a resource block of the second slot, the search spaces comprising resources on which receiving node is to perform a blind detection, said first, second and third search spaces being subdivided into respective candidates, each candidate being included in one or more resource blocks, the blind detection being performed for a plurality of candidates,
wherein at least one candidate of the first or third search space is on same resource block pair as at least one candidate of the second search space and the first search space is determined by a first component carrier, the second search space is determined by a second component carrier, and the third search space is determined by a third component carrier; and
transmitting the sub-frame to the at least one receiving node,
wherein the multi-carrier communication system supports carrier aggregation of a plurality of component carriers.

13. A computer program product comprising a non-transitory computer-readable medium having a computer-readable program code embodied thereon, the program code being adapted to carry out the method according to claim 1.

14. A receiving apparatus for receiving a control information in a downlink within a sub-frame of a multi-carrier communication system supporting carrier aggregation, the control information being related to different component carriers, the receiving apparatus comprising:
a receiving unit for receiving the sub-frame from a transmitting node, the sub-frame including a first and a second slot, wherein the sub-frame includes a plurality of resource block pairs in frequency domain on sub-carriers of one component carrier, each pair comprising a resource block of the first slot and a resource block of the second slot; and
a detecting unit for performing a blind detection for the control information within a first search space in the first slot, within a second search space of the second slot, and within a third search space in the first slot, wherein said first, second and third search spaces being subdivided into respective candidates, each candidate being included in one or more resource blocks, the blind detection being performed for a plurality of candidates,
wherein at least one candidate of the first or third search space is on same resource block pair as at least one candidate of the second search space and the first search space is determined by a first component carrier, the second search space is determined by a second component carrier, and the third search space is determined by a third component carrier, and
wherein the multi-carrier communication system supports carrier aggregation of a plurality of component carriers.

15. The apparatus according to claim 14, wherein
the first slot of a sub-frame includes a plurality of search spaces related to the plurality of component carriers, and
the candidates of the second search space in the second slot are configured in such a way that for each search space from said plurality of search spaces in the first slot, at least one candidate of the second search space is mapped on same resource block pair as a candidate of said search space from said plurality of search spaces.

16. The apparatus according to claim 15, wherein candidates of the second search space mapped onto resource block pairs of different search spaces of the first slot are shifted by different amounts of resource blocks with respect to the start of the respective search space of the first slot.

17. The apparatus according to claim 15, wherein the candidates of the second search space in the second slot are distributed with respect to the search spaces of the first slot in such a way that the number of candidates with a predefined size mapped on each search space of the first slot is same.

18. The apparatus according to claim 17, wherein the candidates of the second search space in the second slot are distributed with respect to the search spaces of the first slot in such a way that a number of candidates with a predefined size mapped on the first search space is higher than a number of candidates with said predefined size mapped on another search space in the first slot.

19. The apparatus according to claim 17, wherein the candidates of the second search space in the second slot are distributed with respect to the search spaces of the first slot in accordance with a format of the control information in such a way that at least two candidates of the second search space are for signalling different formats of the control information.

20. A transmitting apparatus for transmitting control information in a downlink for at least one receiving node within a sub-frame of a multi-carrier communication system supporting carrier aggregation, the control information being related to different component carriers, the transmitting apparatus comprising:
- a mapping unit for mapping control information space for a receiving node onto a first search space in a first slot, onto a second search space in a second slot and onto a third search space in the first slot, the first and the second slot being comprised in the sub-frame, wherein the sub-frame includes a plurality of resource block pairs in frequency domain on sub-carriers of one component carrier, each pair comprising a resource block of the first slot and a resource block of the second slot, the search spaces comprising resources on which receiving node is to perform a blind detection, said first, second and third search spaces being subdivided into respective candidates, each candidate being included in one or more resource blocks, the blind detection being performed for a plurality of candidates,
- wherein at least one candidate of the first or third search space is on same resource block pair as at least one candidate of the second search space and the first search space is determined by a first component carrier, the second search space is determined by a second component carrier, and the third search space is determined by a third component carrier; and
- a transmitting unit for transmitting the sub-frame to the at least one receiving node,
- wherein the multi-carrier communication system supports carrier aggregation of a plurality of component carriers.

* * * * *